US008131641B2

(12) United States Patent
Hicks et al.

(10) Patent No.: US 8,131,641 B2
(45) Date of Patent: Mar. 6, 2012

(54) TECHNIQUES FOR RECONCILING BILLED EXPENSES WITH PROVISIONS OF A LEASE AGREEMENT

(75) Inventors: Brian Robert Hicks, Oakland, CA (US); Amita Singh, Sunnyvale, CA (US); Satyadeep Maheshwari, Noida (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 12/191,045

(22) Filed: Aug. 13, 2008

(65) Prior Publication Data

US 2010/0042524 A1 Feb. 18, 2010

(51) Int. Cl.
*G06Q 40/00* (2006.01)
(52) U.S. Cl. .................................. 705/40; 705/7.41
(58) Field of Classification Search .............. 705/40, 705/7.41
See application file for complete search history.

(56) References Cited

U.S. PATENT DOCUMENTS

| 7,340,424 | B2 * | 3/2008 | Gang et al. ...................... 1/1 |
|---|---|---|---|
| 2001/0037273 | A1 * | 11/2001 | Greenlee, Jr. .................... 705/35 |
| 2005/0251535 | A1 * | 11/2005 | Theissen et al. ............. 707/200 |
| 2006/0095373 | A1 * | 5/2006 | Venkatasubramanian et al. ............................ 705/40 |
| 2006/0173707 | A1 * | 8/2006 | Schubert et al. .................... 705/1 |
| 2007/0027846 | A1 * | 2/2007 | Christiance et al. ............... 707/3 |
| 2007/0294318 | A1 * | 12/2007 | Arora et al. .................... 707/202 |
| 2008/0189195 | A1 * | 8/2008 | Xia et al. ........................ 705/30 |
| 2009/0043824 | A1 * | 2/2009 | Claghorn ...................... 707/200 |
| 2009/0144097 | A1 * | 6/2009 | Fassio et al. ....................... 705/7 |

OTHER PUBLICATIONS http://web.archive.org/web/20070912195244/www.virtualpremise.com/solutions/all_capabilities/op_expense_management.aspx.*

Commentary: Leases and review of operating expense statements Stephen H Berardi. Daily Record. Rochester, NY: Oct. 12, 2007. p. 1.*
(Office Tenants in U.S. Conduct Checks for Lease Overcharges—Audits Increase as Landlords Get More Aggressive in Passing on Costs—Tough Economic Times Bring More Scrutiny) Sheila Muto. asian Wall Street Journal, NY, NY Mar. 15, 2002.*
ADAM Campaign Slick 20070112 (Virtual Premise).*
Lease administration musts—lease abstracting. Johnson, Robert S. San Fernando Valley Business Journal , 11 , 16 , 14(2) Jul. 31 , 2006.*
Road to recovery: new software solutions boost expense recovery calculations by Catherine Malear, Yardi Systems. Malear, Catherine Journal of Property Management , 73 , 4 , 38(3) Jul.-Aug. 2008.*
Siterra Corporation Acquires WorkplaceIQ; Fortifies Real Estate and Asset Lifecycle Management Solution; Siterra Extends Category Leadership across Industries Business Wire Sep. 27, 2005.*
Lease Compliance Review: An Emerging Trend in Client Services. Mokrauer, Donald F.; Aronow, Alan; (Tuny) Mokrauer, Ann B.R. CPA Journal , 70 , 1 , Jan. 30, 2000.*

(Continued)

*Primary Examiner* — William Rankins
(74) *Attorney, Agent, or Firm* — Kilpatrick Townsend & Stockton LLP

(57) ABSTRACT

Techniques for facilitating more efficient and accurate reconciliation processing are provided. Embodiments of the present invention provide techniques for determining a tenant's expected share of operating expenses for a leased property, and for performing a reconciliation to identify discrepancies between the tenant's expected share of the operating expenses and actual amounts of expenses billed to the client by the landlord are provided. The tenant's expected share of the operating expenses is determined based upon operating expense-related information extracted from the lease agreement.

22 Claims, 17 Drawing Sheets

OTHER PUBLICATIONS

Virtual Premise Releases Advanced Desktop Audit Manager for Tenants to Audit Real Estate Operating Expenses and CAM Charges Business Wire. New York: Sep. 10, 2006. p. 1.*
Oracle® Property Manager Implementation Guide Release 12 Part No. B25001-02 Dec. 2006.*
Lease Harbor Announces Completion of New Features PR Newswire May 23, 2001.*
Profit machine: the lease administration department is dropping dollars to retails bottom line. (lease adminstration) Field, Katherine Chain Store Age, 82, 4, 119(2) Apr. 2006 ISSN: 1087-0601.*

* cited by examiner

Method Details | Pro Rata Basis | ExpenseGroups | Caps | Estimated Payments | Critical Dates

Expense Groups
Show All Details  Hide All Details

| Details | *Expense Group Name | *Standard Group Name | *Pro Rata Basis Name | Contribution | Cap | Fee | Multiple | Delete |
|---|---|---|---|---|---|---|---|---|
| Show | CAM and Security | Common Area Maintenan ▼ | Total Mall ▼ | ☐ | ☑ | ☑ | 0.9 | 🗑 |
| Show | Insurance | Insurance ▼ | Inline Only ▼ | ☑ | ☐ | ☑ | 1 | 🗑 |
| Show | Anchor CAM Contribution | Common Area Maintenan ▼ | Total Mall ▼ | ☑ | ☑ | ☑ | 1 | 🗑 |

Common Area Maintenance
Landscaping
Parking Lot
Security
Tax
Insurance
Utilities Add Row ▼ Expense Group Notes

Show All Details  Hide All Details

| Details | Subject | Date Added | User | Update | Delete |
|---|---|---|---|---|---|
| Show | CAM Multiple | 05-Jun-2007 | OPERATIONS | ✎ | 🗑 |
| Show | Anchor Contribution | 05-Jun-2007 | OPERATIONS | ✎ | 🗑 |
| Show | CAM Inclusions | 05-Jun-2007 | OPERATIONS | ✎ | 🗑 |

Add Note

Method Details | Pro Rata Basis | ExpenseGroups | Caps | Estimated Payments | Critical Dates Cancel | Current Reconciliation ▼ Go | Save | Apply Method Details | Pro Rata Basis | ExpenseGroups | Caps | Estimated Payments | Critical Dates :

Critical Dates

| Critical Date | Period | Period Type | Relationship | Event |
|---|---|---|---|---|
| Audit Period End | 18 | Months | After | Statement Receipt |
| Estimate Due from Landlord | 60 | Days | After | Recon. Period Start |
| Reconciliation Payment Due | 1 | Months | After | Statement Receipt |
| Reconciliation Statement due from Landlord | 60 | Days | After | Calendar Year Start |

Statement Receipt
Calendar Year Start
Reconciliation Period Start
Reconciliation Period End 1002  1003  1004  1005  1006

Add Critical Date

1001

▼ Critical Date Notes

Show All Details  Hide All Details

| Details | Subject | Date Added | User | Update | Delete |
|---|---|---|---|---|---|
| Show | Short Audit Period | 05-Jun-2007 | Operations | ✎ | 🗑 |
| Show | Test Length | 05-Jun-2007 | Operations | ✎ | 🗑 |

Add Note

1021

Method Details | Pro Rata Basis | ExpenseGroups | Caps | Estimated Payments | Critical Dates Cancel  Current Reconciliation ▼  Go  Save  Apply

|  | Statement (Override) | Expected | Expected (Override) |
|---|---|---|---|
| Occupied Days | 366.00 | 352.00 | |
| Minimum | | 29,814.00 | |
| Cap | | 36,373.33 | |
| Administration Fee Percent | 8.00 | 6.00 | |
| Total Days | | 366.00 | |
| Paid in Period | 31,148.77 | 34,098.77 | |
| Prior Reconciliation Payments | | 883.23 | |

Tabs: Overview & Notes | Pro Rata Basis | ExpenseGroups | Other Entries

Fig. 14

Update Reconciliation: Review Reconciliation

Switch Reconciliation ▶ Switch Revision ▶ Cancel Next Apply and Create New Revision ▶ Go Save Apply Agreement Name: BHNSTB-Tax  Period Start Date: 15-Jan-2008  *Revision Name: Corrected Agreement  *Reconciliation Status: Not Started
Agreement Number: 1462 - 2  *Period End Date: 31-Dec-2008  Revision Number: 4  Printable Page

|  | Expenses Subject to Cap | | | Expenses Not Subject to Cap | | |
|---|---|---|---|---|---|---|
|  | Statement | Difference | Expected | Statement | Difference | Expected |
| Net Expenses Not Subject to Cap | 88,763.23 |  | 88,763.23 | 34,778.00 |  | 34,778.00 |
| Cap | 93,400.00 |  | 93,400.00 |  |  |  |
| Capped Expenses | 88,763.23 |  | 88,763.23 |  |  |  |
| Pro Rata Percentage | 4.90 |  | 4.90 | 4.90 |  | 4.90 |
| Tenant Share | 4,349.40 |  | 4,349.40 | 1,704.12 |  | 1,704.12 |

Summary

|  | Statement | Difference | Expected |
|---|---|---|---|
| Tenant Share Full Parcel |  |  | 6,053.52 |
| Tenant Total Charge | 6,053.52 |  | 6,053.52 |
| Previous Period |  |  |  |
| Percent Change |  |  |  |
| Adjustment |  |  |  |
| Adjusted Total Charge | 6,053.52 |  | 6,053.52 |
| Occupied Days | 352.00 |  | 352.00 |
| Total Days | 366.00 |  | 366.00 |
| Occupancy Proration Factor | 0.96 |  | 0.96 |
| Occupancy Prorated Total Charge | 5,821.97 |  | 5,821.96 |
| Amount Paid in Period | 12,252.44 |  | 12,252.44 |
| Prior Reconciliation Payments |  |  |  |
| Reconciled Amount | <6,430.48> | 0.00 | <6,430.48> |
| Adjustment |  |  |  |
| Amount Due | <6,430.48> | 0.00 | <6,430.48> |

Statement Due Amount: 1,850.00  Payment Term Amount: 858.34

Switch Reconciliation ▶ Switch Revision ▶ Cancel Next Apply and Create New Revision ▶ Go Save Apply

Fig. 15

| 1621  1600 | Expenses Subject to Cap | | | Expenses Not Subject to Cap | | | |
|---|---|---|---|---|---|---|---|
| | Statement | Difference | Expected | Statement | Difference | Expected | |
| Pro Rata Basis: Total GLA | | | | | | | ←1650 |
| Total Expenses: Subject to Fee | 185,000.00 | | 185,000.00 | 45,000.00 | | 45,000.00 | ←1651 |
| Total Contributions: Before Fee | 25,000.00 | | 25,000.00 | 0.00 | | 0.00 | ←1652 |
| Net Expenses: Subject to Fee | 160,000.00 | | 160,000.00 | 45,000.00 | | 45,000.00 | ←1653 |
| Fee Pecentage | 6.00 | | 6.00 | 6.00 | | 6.00 | ←1654 |
| Fee Amount | 9,600.00 | | 9,600.00 | 2,700.00 | | 2,700.00 | ←1655 |
| Subtotal of Expenses with Fee | 169,600.00 | | 169,600.00 | 47,700.00 | | 47,700.00 | ←1656 |
| Pro Rata Percent | 3.43 | | 3.43 | 3.43 | | 3.43 | ←1657 |
| Tenant Share | 5,814.86 | | 5,814.86 | 1,635.43 | | 1,635.43 | ←1658 |
| Pro Rata Basis: In-line Only | | | | | | | ←1660 |
| Total Expenses: Subject to Fee | 10,000.00 | | 10,000.00 | 0.00 | | 0.00 | ←1661 |
| Fee Pecentage | 6.00 | | 6.00 | 6.00 | | 6.00 | ←1662 |
| Fee Amount | 600.00 | | 600.00 | 0.00 | | 0.00 | ←1663 |
| Subtotal of Expenses with Fee | 10,600.00 | | 10,600.00 | 0.00 | | 0.00 | ←1664 |
| Net Expense Not Subject to Fee | 70,000.00 | | 70,000.00 | 0.00 | | 0.00 | ←1665 |
| Total Net Expenses | 80,600.00 | | 80,600.00 | 0.00 | | 0.00 | ←1666 |
| Pro Rata Percent | 10.00 | | 10.00 | 10.00 | | 10.00 | ←1667 |
| Tenant Share | 8,060.00 | | 8,060.00 | 0.00 | | 0.00 | ←1668 |

Summary 1632 1622   1623 1633   1624 1634   1625 1635   1626   1627   1628

Fig. 16

| | Statement | Difference | Expected | |
|---|---|---|---|---|
| Tenant Share: Subject to Cap | 13,874.86 | | 13,874.86 | ←1647 |
| Cap | 10,800.00 | | 10,800.00 | ←1685 |
| Capped Tenant Share | 10,800.00 | | 10,800.00 | ←1686 |
| Tenant Share: Not Subject to Cap | 1,635.43 | | 1,635.43 | ←1687 |
| Tenant Total Charge | 12,435.43 | | 12,435.43 | ←1635 |
| Previous Period | | | | ←1648 |
| Percent Change | | | | ←1649 |
| Adjustment | | | | ←1636 |
| Adjusted Total Charge | 12,435.43 | | 12,435.43 | ←1637 |
| Occupied Days | 292.00 | | 292.00 | ←1638 |
| Total Days | 365.00 | | 365.00 | ←1639 |
| Occupancy Proration Factor | 0.80 | | 0.80 | ←1640 |
| Occupancy Prorated Total Charge | 9,948.34 | 0.00 | 9,948.34 | ←1641 |
| Amount Paid in Period | 9,090.00 | | 9,090.00 | ←1642 |
| Prior Reconciliation Payments | | | | ←1643 |
| Reconciled Amount | 858.34 | 0.00 | 858.34 | ←1644 |
| Adjustment | | | | ←1645 |
| Amount Due  1673 | 858.34 | 0.00 | 858.34 | ←1646  1671 |

Statement Due Amount  1,850.00  Payment Term Amount  858.34

1631

TECHNIQUES FOR RECONCILING BILLED EXPENSES WITH PROVISIONS OF A LEASE AGREEMENT

BACKGROUND OF THE INVENTION

The present invention relates to property management systems and more particularly to techniques for reconciling expenses billed to a tenant and explained on a reconciliation statement provided by a landlord with provisions of a lease agreement and the payments already made by the tenant for those expenses.

Lease agreements for commercial properties generally include provisions that define the amount that a tenant must pay the landlord. This amount is typically broken down into two components: a rent component and an expenses component. The rent component typically comprises payments due at a predetermined interval established in the provisions of the lease agreement (e.g., monthly, quarterly, or annually). The amount of the payments for the rent component may be fixed or may be variable (e.g., based upon a percentage of the tenant's actual sales). The expenses component comprises various operating expenses that the landlord passes on to the tenants. The operating expenses may be difficult to forecast over the duration of the lease agreement, because the operating expenses may vary greatly from year to year and over the period of the lease due to inflation and other factors outside of the control of the landlord. Landlords offset the risk of inflation by passing on some or all of the operating expenses to tenants.

Tenants often pay a substantial portion of their rent under a commercial lease agreement to cover these operating expenses. One type of operating expense that is often billed to tenants is "Common Area Maintenance" (CAM) charges. CAM charges generally cover the landlord's expenses for maintaining and operating common areas shared by multiple tenants of a rental property. CAM expenses are commonly charged to tenants of office buildings and shopping malls, because these types of commercial properties typically include common areas such as lobbies and parking lots that are shared by multiple tenants. For example, a landlord of a shopping mall property may pass on a proportional share of the costs of maintaining the parking lot, building exteriors, and/or other common areas such as hallways and walkways that are shared by all of the tenants to individual tenants. Other operating expenses, such as the cost of property tax, insurance, heating and lighting the property and supplying water, may also be passed on to tenants.

Various formulas are used to calculate a tenant's share of these operating expenses. These formulas are typically complex. In a typical lease agreement, a tenant is required to pay a proportional share of the operating expenses. The methods used to calculate the proportional share also may vary from lease agreement to lease agreement. Tenants have a strong incentive to monitor the amount of expenses that the landlord passes on to them. Large amounts of money are often at stake. For example, large national chain retailer with numerous locations may save millions of dollars per year by scrutinizing and disputing the expenses charged by landlords.

In a typical lease agreement, a tenant may periodically make estimated payments for operating expenses based upon a budget determined by the landlord. At the end of a reconciliation period determined by the lease, the landlord generates a reconciliation statement that provides a calculation of the operating expense charges attributed to the tenant for the current reconciliation period. Typically, the reconciliation periods are one year in length, but the length of a reconciliation period may vary from lease agreement to lease agreement. The reconciliation statement may show a credit for each of the estimated payments made by the tenant for the year and also the difference between the actual expenses incurred by the landlord and the estimated payments made by the tenant. If the estimated payments exceed the actual expenses, the tenant would be entitled to a refund for the amount of the difference. If the actual expenses are more than the estimated payments, then the tenant would owe the different and would be billed for the difference.

The analysis of the reconciliation statement is often complicated by the fact that the statement formats and the calculations used to determine the expenses to be passed on to the tenant are highly variable. Landlords may also change the format of reconciliation statements from year to year as well as the calculations used to determine tenants' proportional share of the expenses. Thus, year-to-year comparison of reconciliation statements by the tenant is a difficult task. Due to this it becomes difficult for the tenant to uncover unexpectedly large increases in some of the expenses that the landlord passes on to the tenant.

Further complicating the analysis of the reconciliation statement, tenants typically work from paper files and calculators and/or create spreadsheets to double-check the calculations performed by the landlord. These manual processes are inefficient and time-consuming, and comparison of reconciliation data from year to year or from property to property is very difficult.

Accordingly, techniques for facilitating more efficient and accurate reconciliation processing are desired.

BRIEF SUMMARY OF THE INVENTION

Techniques for facilitating more efficient and accurate reconciliation processing are provided. Embodiments of the present invention provide techniques for determining a tenant's expected share of operating expenses for a leased property, and for performing a reconciliation to identify discrepancies between the tenant's expected share of the operating expenses and actual amounts of expenses billed to the client by the landlord are provided. The tenant's expected share of the operating expenses is determined based upon operating expense-related information extracted from the lease agreement.

According to an embodiment of the present invention, a property management system is provided. The property management system comprises an input module and a processing module. The input module is configured to receive expense provisions extracted from a lease agreement and to receive information from a reconciliation statement provided to the tenant by the landlord. The information from the reconciliation statement includes a set of operating expenses and information identifying a portion of the operating expenses for which the tenant is responsible as determined by the landlord. The processing module is configured to validate information identifying the portion of the operating expenses for which the tenant is responsible, wherein the portion for which the tenant is responsible is determined at least in part from the operating expenses-related information received by the input module and to display a summary of operating expenses for which the tenant is responsible, the layout of the summary being dynamically generated based upon the expense-related information from the lease agreement.

According to another embodiment of the present invention a method a method for reconciling operating expenses according to a lease agreement is provided. The method includes (1) receiving information from a lease agreement, the information captured by the input module includes operating being expense-related information that defines a tenant's obligation to pay a share of a landlord's operating expenses; (2) validating the information identifying the portion of the operating expenses for which the tenant is responsible, wherein the portion for which the tenant is responsible is determined at least in part from the operating expenses-related information received by the input module; and (3) displaying a summary of operating expenses for which the tenant is responsible, the layout of the summary being dynamically generated based upon the expense-related information from the lease agreement.

According to yet another embodiment of the present invention a computer readable medium storing a plurality of instructions for controlling a data processor to perform one or more tasks is provided. The plurality instructions includes (1) an instruction that causes the data processor to receive information from a lease agreement, wherein the information includes operating expense-related information that defines a tenant's obligation to pay a share of a landlord's operating expenses; (2) an instruction that causes the data processor to receive information from a reconciliation statement provided to the tenant by the landlord, wherein the information from the reconciliation statement comprises a set of operating expenses and information identifying a portion of the operating expenses for which the tenant is responsible as determined by the landlord; (3) an instruction that causes the data processor to validate the information identifying the portion of the operating expenses for which the tenant is responsible, wherein the portion for which the tenant is responsible is determined at least in part from the operating expenses-related information received by the input module; and (4) an instruction that causes the data processor to display a summary of operating expenses for which the tenant is responsible, the layout of the summary being dynamically generated based upon the expense-related information from the lease agreement.

Other features and advantages of the invention will be apparent in view of the following detailed description and preferred embodiments.

BRIEF DESCRIPTION OF THE DRAWINGS

FIG. 6 is an illustration of a pro rata basis details interface of a lease operating expenses agreement component of a property management system according to an embodiment of the present invention.

FIG. 7 is an illustration of an expense group details interface of a lease operating expenses agreement component of a property management system according to an embodiment of the present invention.

FIG. 10 is an illustration of a critical dates interface of a lease agreement operating expenses component of a property management system according to an embodiment of the present invention.

FIG. 14 is an illustration of an other entries interface of a reconciliation component of a property management system according to an embodiment of the present invention.

FIG. 15 is an illustration of a review reconciliation interface of a reconciliation component of a property management system according to an embodiment of the present invention.

FIG. 16 is another illustration of a review reconciliation interface of a reconciliation component of a property management system according to an embodiment of the present invention.

Embodiments of the invention are described here, with reference to the figures. Where elements of the figures are called out with reference numbers, it should be understood that like reference numbers refer to like elements and might or might not be the same instance of the element.

DETAILED DESCRIPTION OF THE INVENTION

Figure 1:
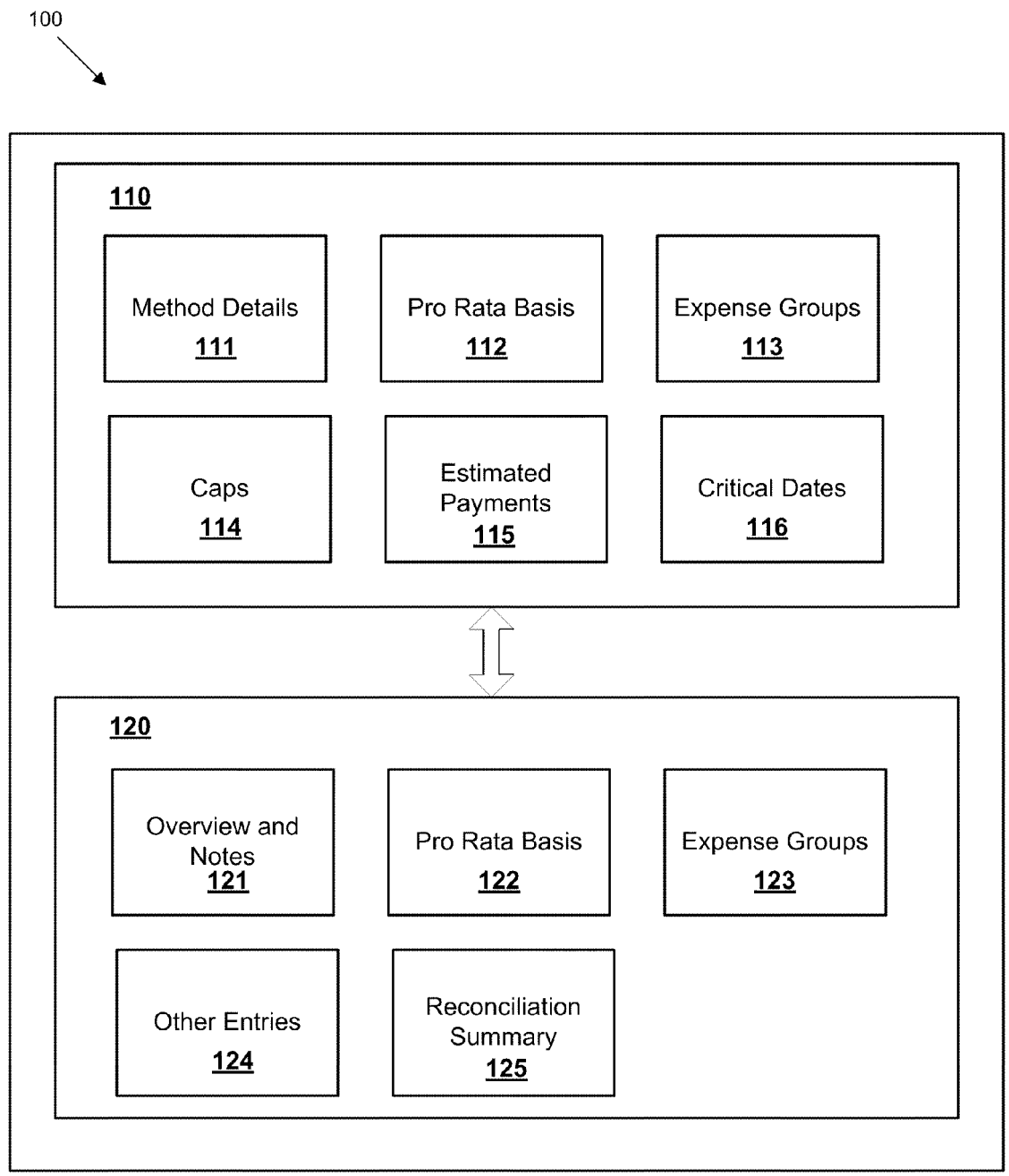
FIG. 1 is a high level block diagram of a property management system according to an embodiment of the present invention.

In the following description, for the purposes of explanation, specific details are set forth in order to provide a thorough understanding of the invention. However, it will be apparent that the invention may be practiced without these specific details.

Techniques for facilitating more efficient and accurate reconciliation processing are provided. Embodiments of the present invention provide techniques for determining a tenant's expected share of operating expenses for a commercial property and for identifying discrepancies between the tenant's expected share of the operating expenses and an amount of operating expenses attributed to the client by the landlord. The amount of operating expenses attributed to the client by the landlord is the actual amount of operating expenses that the landlord bills to the client for the reconciliation period. The tenant's expected share of the operating expenses for the commercial property is the amount resulting from the tenant's recalculation of the amount of operating expenses attributed to the client by the landlord, based on provisions in the lease, and information from the landlord and other sources available to the tenant.

The following is a description of some of the terms used throughout this disclosure:

Landlord—a person or entity that owns a property and rents at least a portion of the property to one or more persons or commercial entities.

Tenant—a person or commercial entity that rents at least a portion of the property from the landlord. Some tenants may contract out portions of the reconciliation process to a third party. For the purposes of this disclosure, the term tenant may also refer to an agent of the tenant (such as a third party auditor).

Common areas—portions of a leased property of which access and/or usage may be shared by multiple tenants. Examples of common areas include, but are not limited to hallways, parking lots, sidewalks, and/or other areas not under the exclusive control of one tenant. The landlord is typically responsible for the maintenance of the common areas, but may pass on operating costs associated with maintaining these areas to the tenant. For example, the landlord may pass on the cost of electricity, water, security, insurance, taxes, and/or other such operating expenses related to the common areas.

Lease agreement—a legal contract between a landlord and a tenant to provide the tenant with use of at least a portion of a property for a specified duration in return for a payment (rent). A lease agreement may include provisions that define a fixed amount of rent that the tenant is required to pay the landlord periodically. For example, the tenant may be required to monthly, quarterly, or annual payments to the landlord for use of the property. The lease agreement may also include provisions that define variable expenses, such as for operating expenses, for which the tenant may also be responsible for paying to the landlord.

Operating expenses—ongoing expenses incurred by the landlord for operating a leased property. Some examples of operating expenses include utilities, such as electricity and water, insurance, security, and maintenance of the property. Operating expenses may comprise a significant portion of the landlord's budget. Landlords often pass on at least a portion of the operating expenses to tenants, and each tenant may pay a pro rata share of the operating expenses. Tenants typically pay their pro rata share of the operating expenses (which are variable) in addition to a fixed or flat rate amount of rent.

Reconciliation period—an interval of time for which the tenant's actual share of the landlord's operating expenses is determined. The reconciliation period is often defined in the lease agreement, and may vary from lease agreement to lease agreement, or on an ad hoc basis in response to events such as the sale of a property to a new owner. A typical reconciliation period is one year. However, longer or shorter reconciliation periods may be provided, such as a quarterly reconciliation period or a multi-annual reconciliation period. At the end of the reconciliation period, the landlord determines the tenant's actual share of operating expenses for the reconciliation period and provides a reconciliation statement to the tenant.

Reconciliation statement—an invoice provided to the tenant by the landlord that includes a breakdown of the landlord's operating expenses for a reconciliation period and a calculation of the tenant's share thereof. The reconciliation statement may indicate an amount that the tenant owes for the tenant's share of the operating expenses if the sum of the estimated payments made by the tenant are less than the tenant's share of the operating expenses for the reconciliation period, or the reconciliation statement may indicate a credit balance if the sum of the estimated payments made by the tenant exceeds the tenant's share of the operating expenses for the reconciliation period.

Estimated payment—a payment made toward the tenant's pro rata share of the operating expenses. The amount of estimated payments to be paid by the tenant is often determined by the landlord based upon the landlord's projected operating budget. Landlords may revise their operating budgets periodically. As a result, the amount of estimated payments to be made by the tenant may change. Estimated payments may be made periodically (e.g. monthly or quarterly) and the amount of the estimated payments may be revised periodically by the landlord.

Catch up payment—a payment made in response to the landlord retroactively increasing the amount of each estimated payment owed to the landlord by the tenant. The amount of the catch up payment is equal to the difference between the amount of any estimated payments after the effective date of the revised estimated payment amount and the revised payment amount.

Reconciliation payment—after receiving the reconciliation statement from the landlord, the tenant may make one or more reconciliation payments to the landlord to pay any additional amount of the tenant's share of the operating expenses after any estimated payments made by the tenant have been deducted.

Property management system—a system for automating the management of lease agreements. The property management system may include various functionality for allocating leasable space, allocation of operating expenses to tenants, and/or other functionality. The property management system may be implemented in hardware, software, and/or a combination thereof.

Management of operating expenses related to a lease agreement may include several cyclical processes. Typically, management of operating expense begins with a lease agreement cycle. A first step in lease agreement cycle is the landlord and tenant entering into a lease agreement. Typically, the lease agreement will include provisions that define an amount of the operating expenses for which the tenant will be responsible (if any). The landlord and tenant may negotiate amendments to the lease agreement over time. These amendments may change the amount of operating expenses for which the tenant is responsible.

Many operating expense-related lease provisions require that the tenant periodically make estimated payments toward the amount of operating expenses for which the tenant is responsible. For example, the payments may be made monthly or quarterly. The amount of each estimated payment is typically determined by the landlord, based upon the landlord's budget and based upon preliminary calculations to determine the tenant's share of the operating expenses for the reconciliation period. These payments are referred to as "estimated" payments because the actual amount of operating expenses for the reconciliation period often cannot be determined in advance. Various factors outside of the control of the landlord may cause the operating expenses to be unpredictable. For example, utility bills for water and/or electricity may vary, the cost of insurance might increase, or taxes owed on the property by the landlord may increase or decrease. Thus, the actual amount of operating expenses may not be known until the end of the reconciliation period, when the landlord prepares a reconciliation statement.

A second cyclical process involves the landlord reviewing the budget for operating expenses, often annually, to determine whether the estimated payment amount is sufficient to cover the tenant's share of the operating expenses. Sometimes, the landlord may determine that a different (usually higher) estimated payment amount is required. The landlord then advises the tenant of the obligation to pay the revised estimated payment amount. The revised estimated payment amount is often effective retroactively, which requires that the tenant make a catch up payment for the different between any estimated payments made for the old estimated payment amount since the effective date of the revised estimated payment and the new revised estimated payment amount.

A third cyclical process is the reconciliation or audit process. At the end of the reconciliation period, the landlord calculates the tenant's share of actual operating expenses for the reconciliation period. The tenant is provided with a reconciliation statement which provides a breakdown of the actual expenses and the calculation of the portion for which the tenant is responsible and any differences between the actual amount for which the tenant is responsible and the estimated payments that the tenant has made. The reconciliation statement typically compares the tenant's share of actual operating expenses as determined by the landlord with the estimated payments made by the tenant.

After the reconciliation statement has been received by the tenant, the tenant may perform a basic reconciliation. The basic reconciliation is performed to determine whether the landlord has correctly credited the tenant for the sum of estimated payments made for the reconciliation period.

The tenant may elect to perform a more in depth audit to verify the accuracy of the contents of the reconciliation statement. One type of audit that the tenant may elect to perform is a desktop audit and another type of audit that the tenant may elect to perform is a field audit. In a desktop audit, the tenant reviews information from the tenant's records and may also gather additional information from the landlord and/or others in an attempt to verify the accuracy of the information included in the reconciliation statement. For example, the tenant may gather information from a store manager or office manager at the leased property in addition to gathering information from the landlord. As an example, a tenant at a shopping mall might contact the store manager to confirm the occupancy percentage during the reconciliation period if the occupancy percentage on the reconciliation statement appears to be significantly off and the store manager can show that a major anchor tenant moved in or out of the shopping mall during the reconciliation period, or the tenant might contact the store manager to determine whether the area where the store is located had experienced a particular harsh winter in order to explain a significant increase in snow removal costs for the reconciliation period.

In a field audit, the tenant may review the landlord's books to verify the expenses reported on the reconciliation statement, contributions by other tenants, the area occupied by the tenant and/or other tenants, and occupancy of the property during the reconciliation period. Some landlords may make the information for the field audit available in electronic format. Some tenants may also contract with third party service providers to perform desktop audits and/or field audits.

FIG. 1 is a high level block diagram of a property management system 100 according to an embodiment of the present invention. Property management system 100 provides various interfaces that enable a user, such as a tenant, to enter information from a lease agreement, a reconciliation statement from a landlord, and/or other information related to operating expenses associated with a leased property, and for displaying information. Property management system 100 may be implemented as software (e.g. program code, instructions), hardware, or a combination thereof.

Property management system comprises a lease agreement component 110 and a reconciliation component 120. The lease agreement component 110 provides an interface for the user to enter operating expense-related information from a lease agreement and for displaying information related to the lease agreement. The lease agreement component 110 comprises "method details" component 111, "pro rata basis" component 112, "expense groups" component 113, caps component 114, "estimated payments" component 115, and a "critical dates" component 116.

Figure 5:
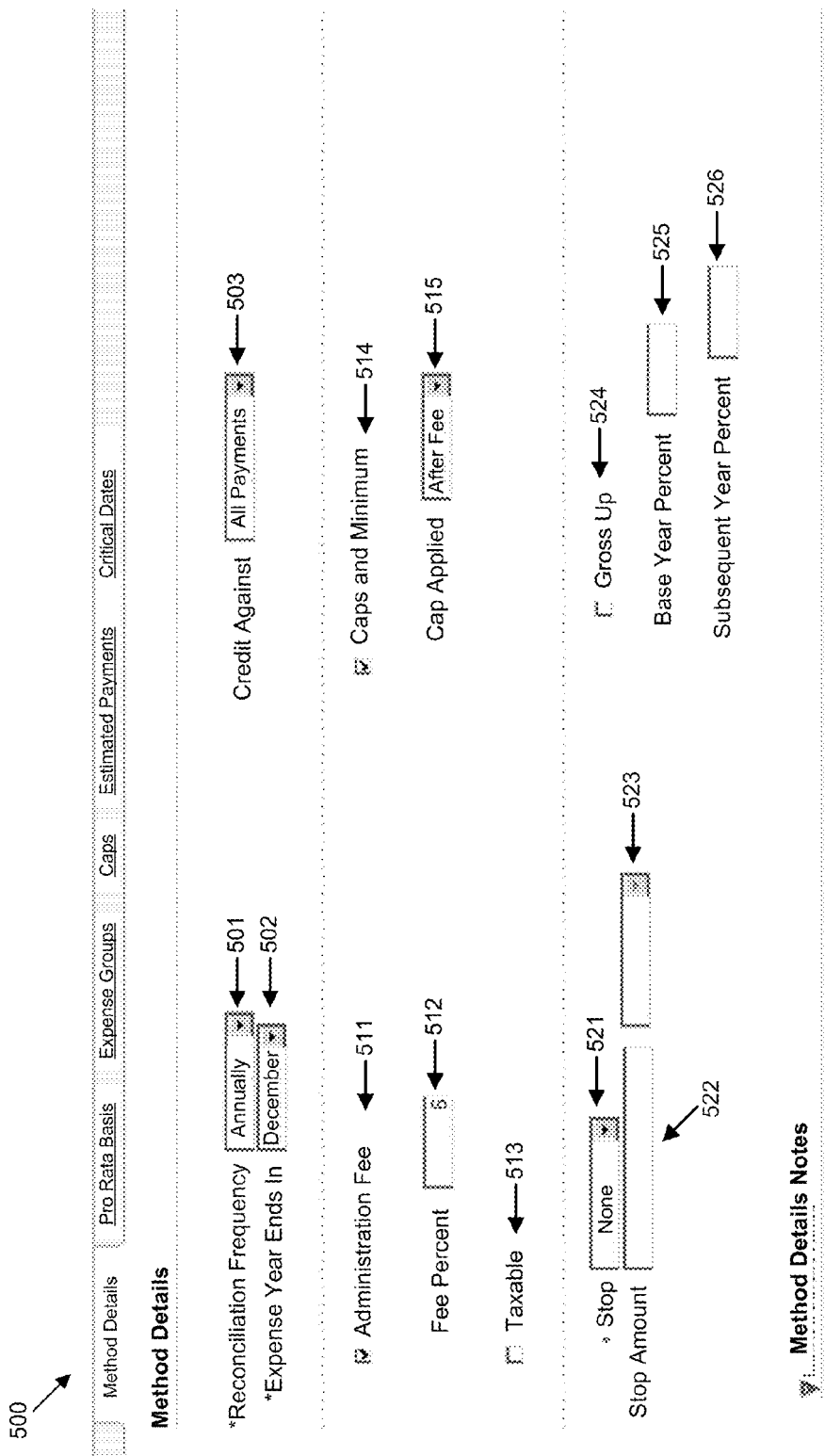
FIG. 5 is an illustration of a method details interface of a lease operating expenses agreement component of a property management system according to an embodiment of the present invention.

"Method details" component 111 provides an interface for entering and displaying information used for performing reconciliations, such as how frequently reconciliations are to be performed (e.g. annually, bi-annually, etc.), and for entering and displaying other information, such as whether the tenant's share of the operating expenses for the reconciliation period are taxable, whether the tenant's share is subject to caps or minimums that defined upper and lower limits to the tenant's share of the operating expense, and whether the tenant's share of the operating expenses may be subject to administration fees. The administration fees may in some instance be calculated as percentage of the landlord's direct costs associated with operating the property. For example, the landlord may contract with landscaping firms, security firms, and/or janitorial firms to provide various services at the property. The landlord may pass a percentage of these costs directly on to the tenant, and in some instances may include an additional amount (typically a percentage of the charges passed on the tenant) to cover the landlord's expenses incurred for managing the various contractors. The landlord may contract with third party property management company to manage the property for the landlord, and the third party property management company may in turn subcontract out various services to subcontractors. The costs associated with the third party property management company and any subcontractors may be passed on to the tenants. The various information entered and displayed via the interface of "method details component" 111 is typically found in operating expense-related provisions of the lease agreement. FIG. 5, described below, provides an illustration of an interface of "method details" component 111 according to an embodiment of the present invention.

Figure 6:
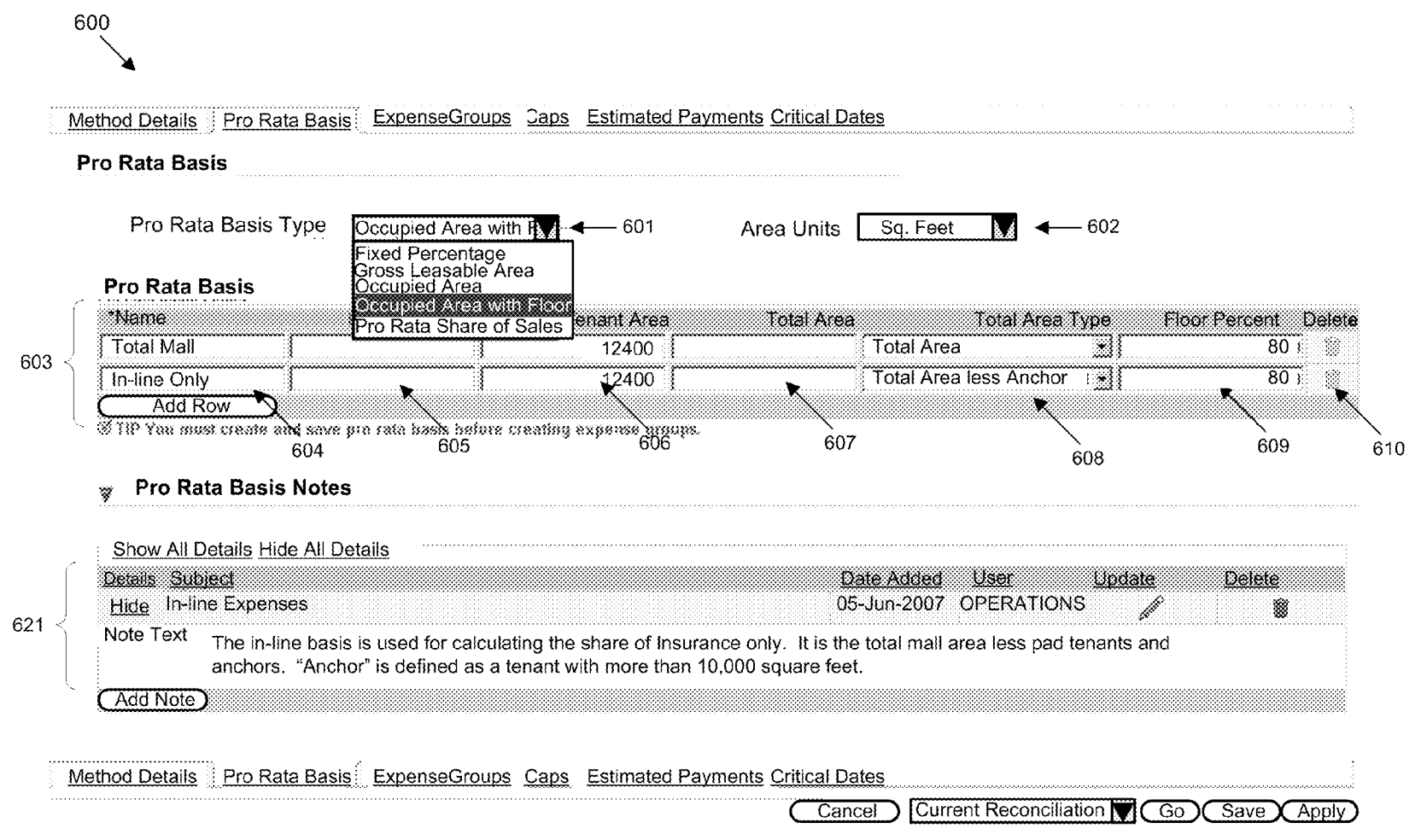

"Pro rata basis" component 112 provides an interface for entering and displaying information used to determine the basis for calculating the tenant's proportional share of the operating expenses for a reconciliation period. For a typical lease agreement, a single pro rata basis to be used for determining the tenant's share of the operating expenses is included in the lease provisions. However, some lease agreements may provide different pro rata bases for determining the tenant's share of different types of operating expenses. FIG. 6, described below, provides an illustration of an interface of "pro rata basis" component 112 according to an embodiment of the present invention.

"Expense groups" component 113 provides an interface for entering and displaying information about various types of operating expenses for which the tenant is responsible, according to the lease agreement. Some tenants may lease multiple properties from multiple landlords, and thus, have multiple lease agreements for which operating expenses will need to be reconciled. Landlords may use different naming conventions for similar operating expenses. "Expense groups" component 113 enables the tenant to correlate landlord-specific expense types from each of the lease agreements to a "standard" set of operating expense types defined by the tenant. This enables the tenant to more track similar expenses for each of the tenant's leased properties. "Expense groups"

component 113 also enables the tenant to indicate whether the expenses for which the tenant is responsible are subject to fees and/or caps. Fees and/or caps may have a significant impact on the amount that a tenant may owe. Caps place constraints on tenant's share of the operating expenses. Fees may be fixed amount or a percentage of the operating expenses added to the tenant's share of the operating expenses to cover the landlord's administrative costs. Landlords often make mistakes related to fees and/or caps when determining the tenant's share of the operating expenses, such as fees being charged where they should not. "Expense groups" component 113 provides an interface that enables the tenant to indicate whether fees and/or caps apply to each particular type of expenses in a lease agreement. FIG. 7, described below, provides an illustration of an interface of "expense groups" component 113 according to an embodiment of the present invention.

Figure 8:
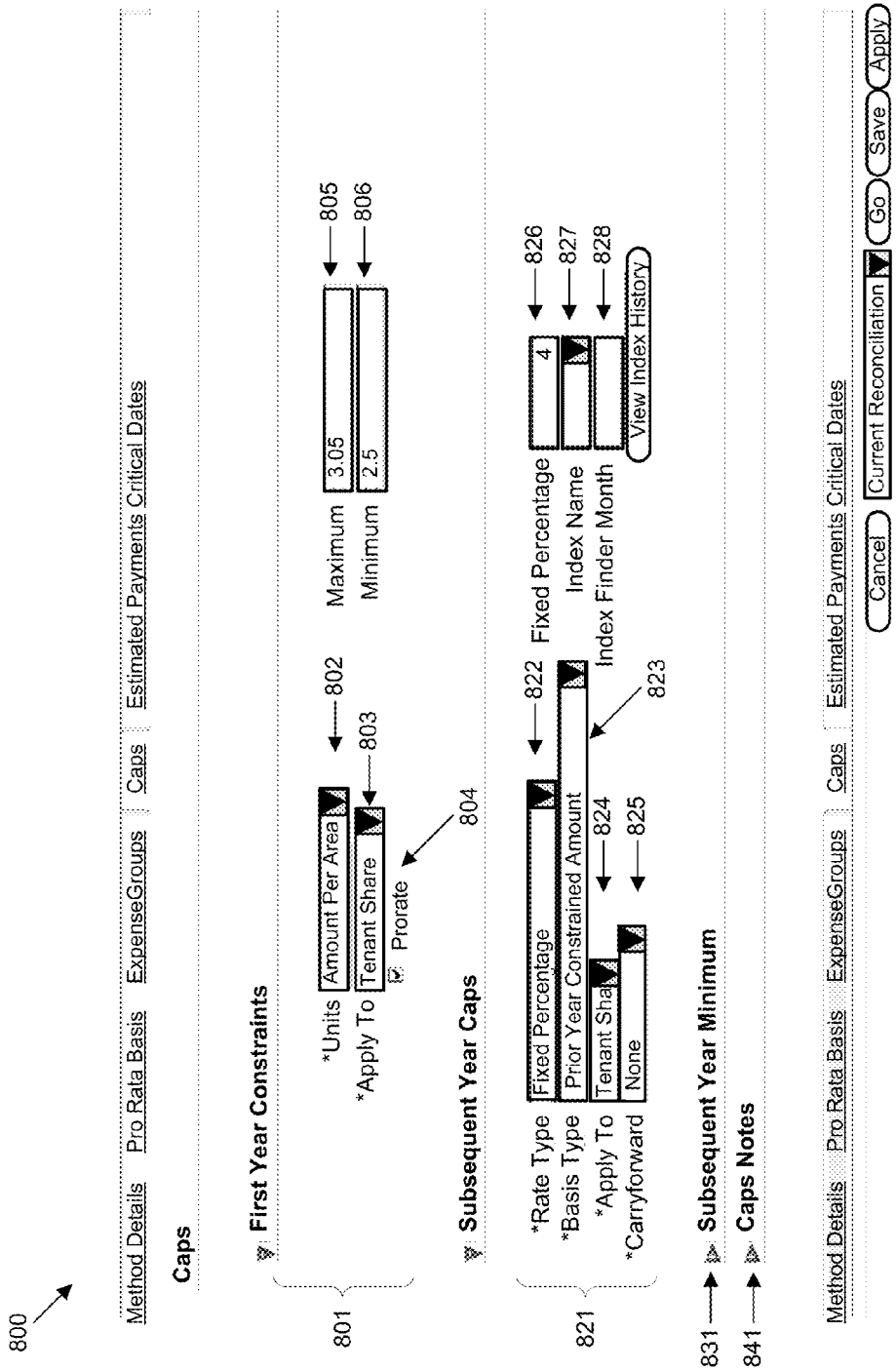
FIG. 8 is an illustration of a caps interface of a lease operating expenses agreement component of a property management system according to an embodiment of the present invention.

"Caps" component 114 provides an interface for entering and displaying constraints (maximums and/or minimums) on tenant's share of the operating expenses. Maximums and/or minimums may be applied to all operating expenses or may be applied only to specific types of expenses. Typically, only one type of cap may be associated with a lease agreement, and this cap applies to all expenses subject to a cap. However, some lease agreements may include provisions for first year caps. First year caps are defined as fixed amount, while caps for subsequent years of the lease agreement are defined as a percentage change in the amount of an expense relative to a prior reconciliation period. As an example, the tenant's share of expenses associated with taxes may be capped at $10,000 for the first year, and may be capped at 3% thereafter. Thus, the tenant would be liable for no more than $10,300 for the second year. FIG. 8, described below, provides an illustration of an interface of "caps" component 114 according to an embodiment of the present invention.

Figure 9:
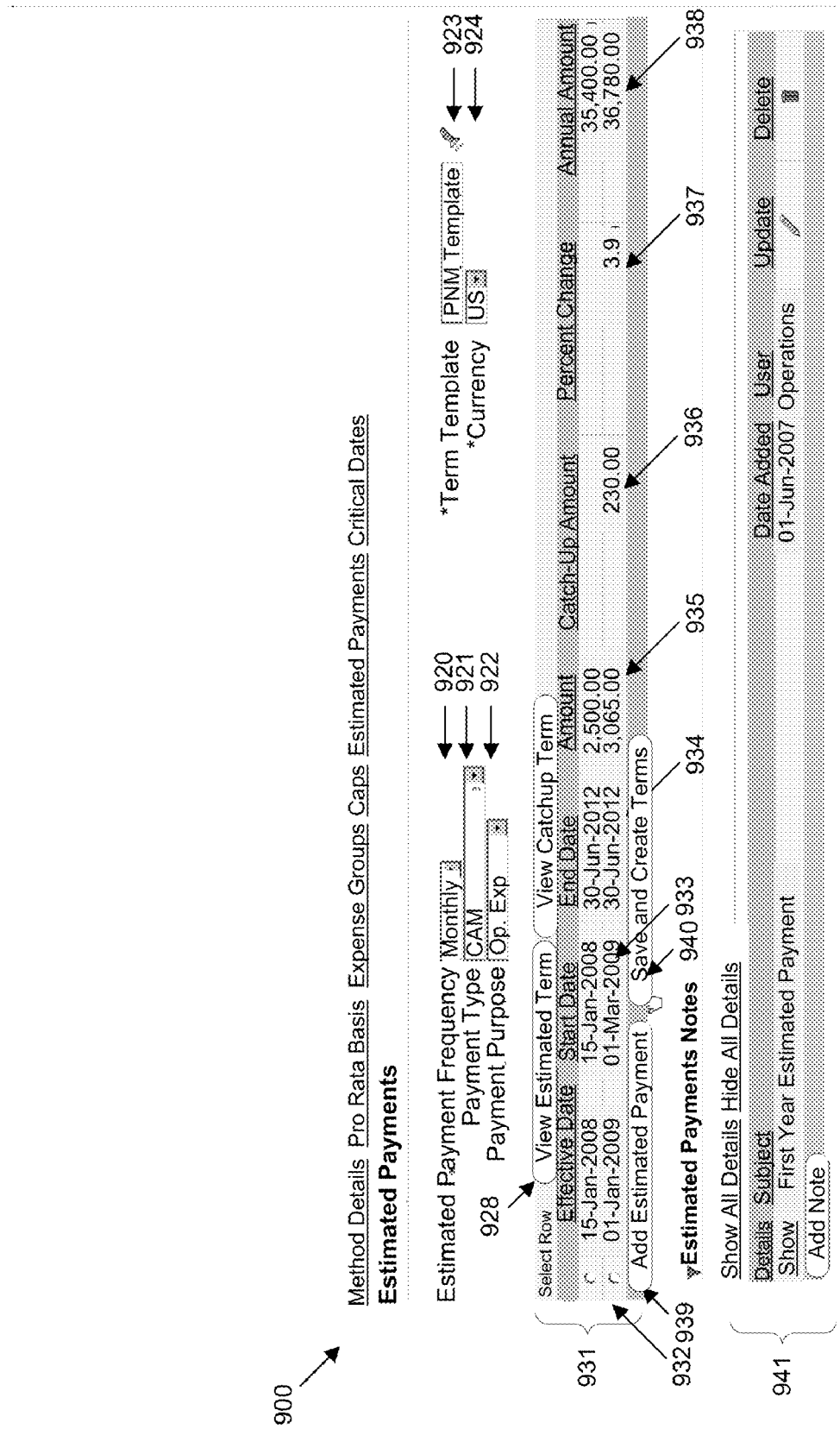
FIG. 9 is an illustration of an estimated payments interface of a lease operating expenses agreement component of a property management system according to an embodiment of the present invention.

"Estimated payments" component 115 provides an interface for entering and displaying estimated payment information. Estimated payments may be made by the tenant throughout a reconciliation period and are applied toward the tenant's share of the operating expenses for the reconciliation period. The initial amount of estimated payments may be provided in some lease agreements, and/or may be provided to the tenant periodically by the landlord based upon the landlord's budget estimates for the reconciliation period. FIG. 9, described below, provides an illustration of an interface of "estimated payments" component 115 according to an embodiment of the present invention.

"Critical dates" component 116 provides an interface for entering and displaying information related to dates critical to the reconciliation period. Critical dates component 116 defines rules for four dates that are critical to the reconciliation process: (1) the audit period end date; (2) the date that notice of revision to estimated payment amount is due from landlord; (3) the reconciliation payment due date; and (4) the date that the reconciliation statement due from landlord. Each of these dates is a recurring date. At the time that the lease agreement is established, the actual dates may not be known. However, most lease agreements specify the rules which define how to determine these dates. FIG. 10, described below, provides an illustration of an interface of "critical dates" component 116 according to an embodiment of the present invention.

Reconciliation component 120 comprises "overview and notes component" 121, "pro rata basis" component 122, "expense groups" component 123, "other entries" component 124, and "review reconciliation" component 125. Reconciliation component 120 provides interfaces for capturing information from a reconciliation statement received from a landlord and for displaying the reconciliation information. Reconciliation component 120 dynamically generates the information to be displayed in the interface based upon the operating expense-related information extracted from the lease agreement and entered in lease agreement component 110.

Figure 11:
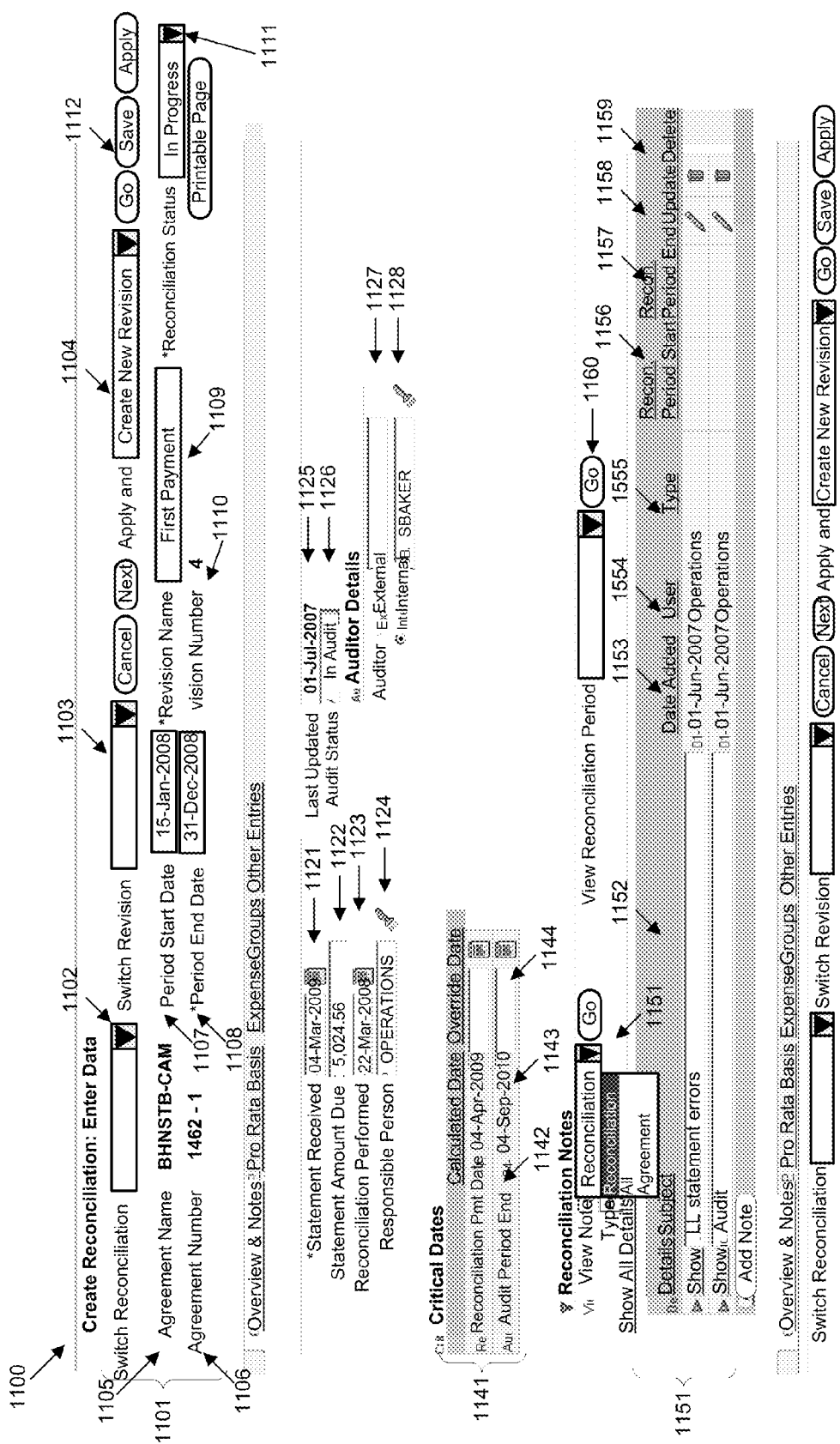
FIG. 11 is an illustration of an operating expenses reconciliation data entry user interface of a property management system according to an embodiment of the present invention.
Figure 12:
FIGS. 12A, 12B, 12C, 12D, and 12E are illustrations of various pro rata basis user interfaces of a reconciliation component of a property management system according to embodiments of the present invention.

"Overview and notes component" 121 provides an interface for entering and displaying information for performing a reconciliation. The interface may be used to display information that has been previously entered for a reconciliation or may be used to create a new reconciliation. Information such as the critical dates, entered via "critical dates" component 116 and other information entered via "lease agreement" component 110 may be displayed by default in the interface, but the tenant may override some of the values by inputting a new value into the interface. FIG. 11, described below, provides an illustration of an interface of "overview and notes" component 121 according to an embodiment of the present invention.

"Pro rata basis" component 122 provides an interface for entering and displaying information for the reconciliation related to the pro rata bases used to determine the tenant's share of the operating expenses. The layout of the information provided on the interface may be dynamically generated based upon the type or types pro rata bases entered in the interface of "pro rata basis" component 112 of lease agreement component 110. The interface includes a comparison of "expected" pro rata basis information and information from the reconciliation statement, which enables the tenant to identify at a glance, any discrepancies between the expected values based upon the information entered via lease agreement component 110, and the information provided on the reconciliation statement. Some values entered via the interface of "pro rata basis" component 112 may be displayed as default information in the "expected" portion of the interface of "pro rata basis 122." However, the tenant may optionally override in the interface of "pro rata basis" component 122 the values entered via the interface of "pro rata basis" component 112. FIGS. 12A-12E, described below, provide illustrations of interfaces of "pro rata basis" component 122 according to embodiments of the present invention.

Figure 13:
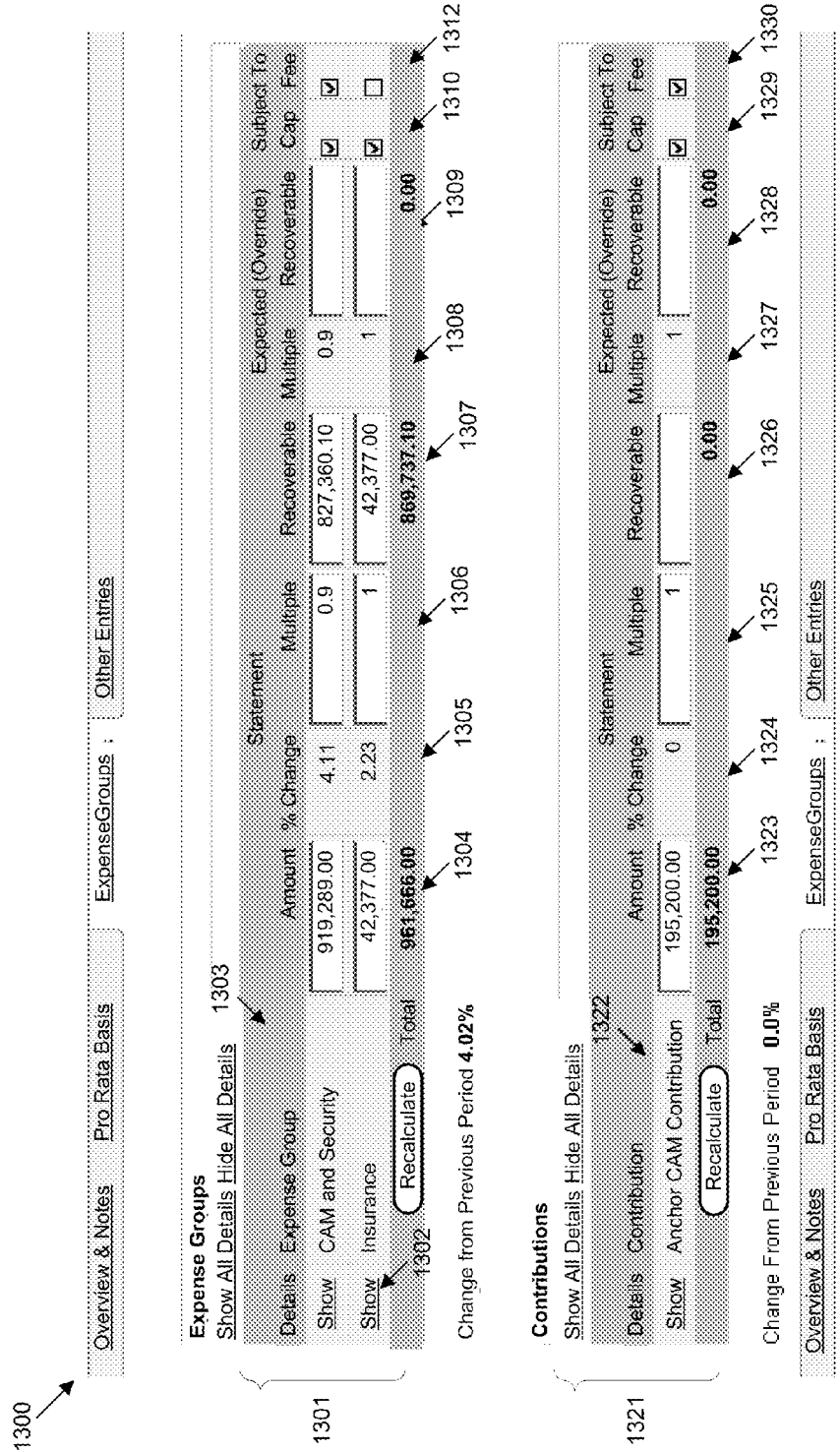
FIG. 13 is an illustration of an expense groups interface of a reconciliation component of a property management system according to an embodiment of the present invention.

"Expense groups" component 123 provides an interface for entering and displaying the actual amounts, for the reconciliation period, for each of the various expense groups entered via the interface of "expense groups" component 113. The interface of "expense groups" component 123 provides a comparison of the tenant's "expected" amount (the amount the tenant has reason to believe is correct) for each expense group entered into lease interface component 110 with amounts stated on the reconciliation statement provided by the landlord. Information about each expense group entered via the interface of "expense groups" component 113, such as name and whether that expense group is subject to a cap is displayed by default in the interface of "expense groups" component 123. The interface of "expense groups" component 123 may be used to enter information related to operating expenses from a reconciliation statement or may be used to view data previously entered for a reconciliation. FIG. 13, described below, provides an illustration of an interface of "expense groups" component 123 according to an embodiment of the present invention.

"Other entries" component 124 provides an interface for entering and displaying other information related to operating expenses that may be used to determine the tenant's expected share of the operating expenses. For example, the interface of "other entries" component 124 may display information related to the number of days that the tenant occupied the leased premises during the reconciliation period, information related to caps and/or minimums that may be applied to the tenant's share of the operating expenses. The layout and content of the interface may be dynamically generated based upon information entered via lease agreement component 110, such as a cap amount placed on the tenant's share of the operating expenses. FIG. 14, described below, provides an illustration of an interface of "expense groups" component 124 according to an embodiment of the present invention.

"Review reconciliation" component 125 provides an interface for displaying a comparison of a summary of information used to determine the tenant's expected share of the operating expenses for the reconciliation period with a summary of information entered from the reconciliation statement. The interface includes inputs for receiving adjustment amounts that may be used to override expected or statement amounts. "Review reconciliation" component 125 provides the tenant with an "amount due" that reflects the amount of money that the tenant owes the landlord for operating expenses for the reconciliation period (less any estimated payments and/or reconciliation payments that the tenant has already made for the reconciliation period). FIG. 15, described below, provides an illustration of an interface of "review reconciliation" component 125 according to an embodiment of the present invention.

Figure 2:
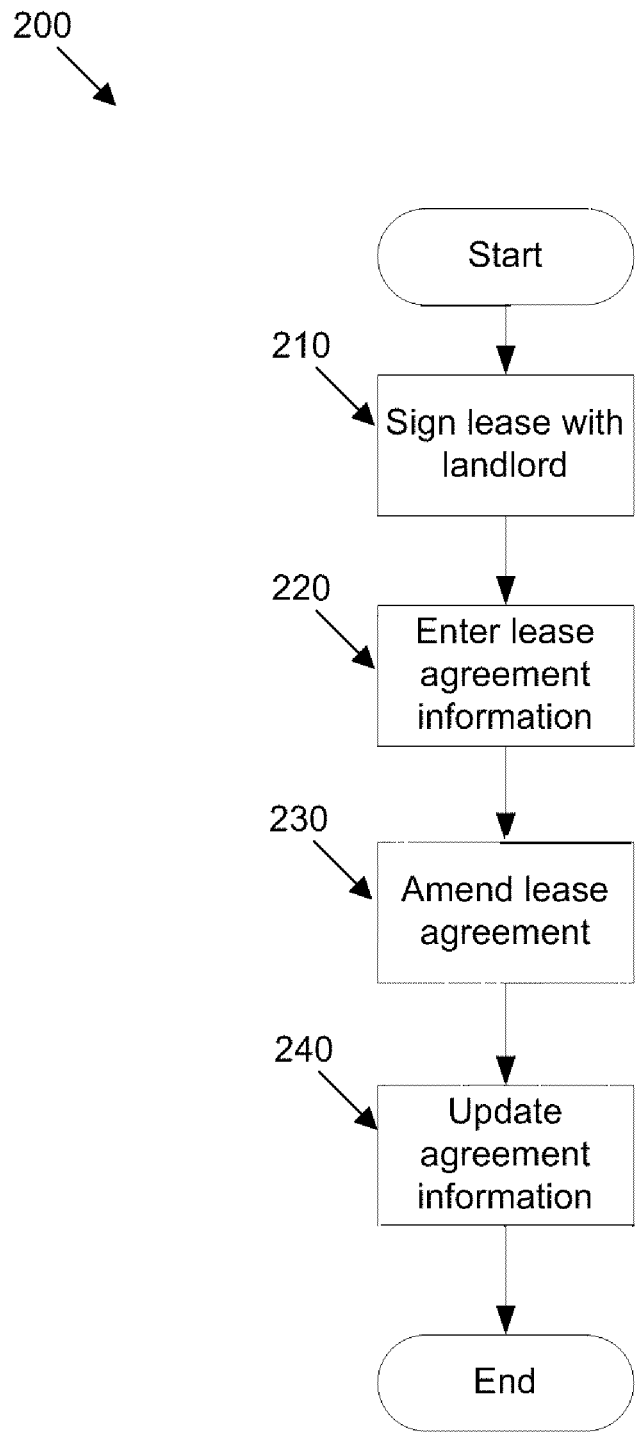
FIG. 2 is a high level flow diagram of a method for capturing operating expense-related provisions from a lease agreement according to an embodiment of the present invention.

A typical lease agreement for commercial property outlines the tenant's responsibility to pay rent and also a portion of the operating expenses for the property. FIG. 2 is a high level flow diagram of a method 200 for capturing operating expense-related provisions from a lease agreement according to an embodiment of the present invention. Method 200 may be performed by software (e.g. program code, instructions) executed by a processor, by hardware, or a combination thereof.

Method 200 begins with step 210, where a tenant enters a lease agreement with the landlord for use of a property. Method 220 then continues with step 220, where the tenant enters information about operating expense-related lease provisions into a property management system to facilitate analysis of a reconciliation statement received from the landlord at the end of a reconciliation period. As describe above, the length of a reconciliation period may vary from the lease agreement to lease agreement. FIGS. 5-10, described below, illustrate an interface for capturing operating expense-related lease provisions in lease agreement component of a property management system according to embodiments of the present invention.

Sometimes a tenant and landlord will renegotiate provisions of a lease. As a result, some of the operating expense-related provisions of the lease agreement may be modified. In the event that provisions of the lease agreement are modified (step 230), the tenant may amend the operating expense-related lease agreement information stored by the property management system to reflect the new terms of the lease (step 240). Method 100 terminates at upon completing step 230.

The lease provisions captured in the property management system may then be used for various operations. For example, the lease provisions may be used to determine the tenant's expected share of operating expenses for the commercial property, to compare this value to the actual amount of operating expenses that the landlord bills to the client, and to identify discrepancies between the tenant's expected share of the operating expenses and the actual amount of operating expenses that the landlord that has attributed to the tenant.

Figure 3:
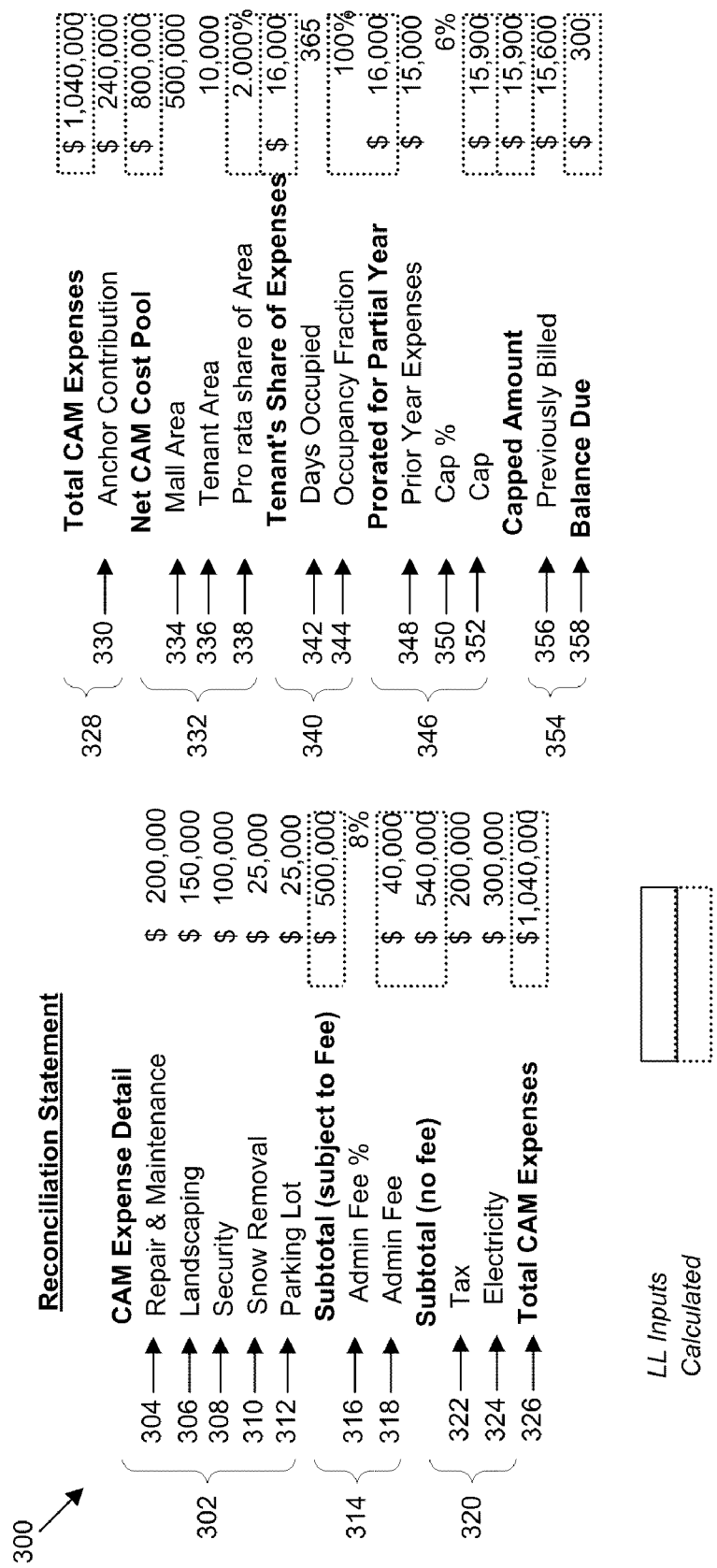
FIG. 3 is an exemplary reconciliation statement according to an embodiment of the present invention.

FIG. 3 is an exemplary reconciliation statement 300 according to an embodiment of the present invention. As described above, the landlord produces a reconciliation statement at the end of every reconciliation period. Typically, a reconciliation period is a year, and the tenant will receive a reconciliation statement annually. However, shorter or longer reconciliation periods may be established in the lease agreement.

The way that landlords present reconciliation agreements can vary from landlord to landlord, agreement to agreement and/or from year to year. Reconciliation statement 300 is an example of a reconciliation statement that illustrates the type of information that may be included in a reconciliation statement.

As depicted in FIG. 3, reconciliation statement 300 comprises a CAM expense detail section (section 302) includes a plurality of common area management expenses including: repair and maintenance (line 304) for $200,000, landscaping (line 306) for $150,000, security (line 308) for $100,000, snow removal (line 310) for $25,000, parking lot maintenance (line 312) for $25,000. The common area management expenses are values calculated and provided by the landlord. One skilled in the art will recognize that other types of CAM expenses may also be included in the reconciliation statement, and that the types of expenses included in this example are merely exemplary. Reconciliation statements may vary in the amount of detail that they show. For example, some statements may provide a finer level of granularity of detail with charges broken out into more line items, while others may provide less detail with related expenses grouped together.

Subtotal (subject to fee) (line 314) provides a total of the CAM expenses that are subject to an administration fee. Some landlords charge an administration fee equal to a percentage of certain types of CAM expenses. For example, the CAM expenses described in the CAM expense detail section (section 302) are subject to an 8% administration fee (line 316) in this example. In this example $500,000 is subject to administration fees. Therefore, the administration fee is $40,000 (line 318).

Subtotal (no fee) (section 320) provides a subtotal of the CAM charges including the administration fee for a total of $540,000. Additional CAM charges that are not subject to an administration fee are then added to the subtotal of line 220: tax of $200,000 (line 322) and electricity (line 324). Total CAM expenses (line 326) includes the total of the CAM expenses subject to the administration fees ($500,000), the administration fees ($40,000), and the total of the CAM charges not subject to an administrative fee ($500,000) for a total of $1,040,000. One skilled in the art will recognize that the types of CAM charges that are subject to an administration fee and those that are not subject to an administration fee may vary from agreement to agreement.

The total CAM charges are carried over to the second column of the reconciliation statement 300 (line 328). An anchor contribution (line 330) of $240,000 is subtracted from the total CAM expenses (line 328) to arrive at a net CAM cost pool of $800,000 (line 332). The anchor contribution (line 330) is an operating expense amount that is paid by a major or anchor tenant. The anchor tenant contribution is first deducted from the operating expenses. The remaining amount in the net CAM cost pool (line 332) comprises the remainder of the operating expenses that are to be proportionally allocated to the non-anchor tenants.

The mall area (line 334) indicates that the total square footage of the mall is 500,000 sq ft. The tenant area (line 336) indicates that the tenant occupies 10,000 sq ft of the total mall area. Pro rata share (line 338) indicates that the tenant occupies 2% of the mall area. Therefore, the tenant will be liable for 2% of the net CAM cost pool (line 332) of $800,000. The tenant's share of the expenses (line 340) is equal to $16,000, which is 2% of $800,000.

Days occupied (line 342) indicates how many days of the past year the tenant occupied the space in the mall. In this example, the tenant occupied the space for the entire year, so the days occupied is equal to 365, and the occupancy fraction (line 344) is equal to 100%. Therefore the prorated partial year (line 346) value is equal to $16,000. The prorated partial year value (line 346) is determined by multiplying the tenant's share of expenses (line 340) by the occupancy fraction (line 344) If the tenant had only occupied the space for a portion of the year, the days occupied would reflect that value, and the occupancy fraction would be decreased, resulting in the tenant owing less than $16,000.

The tenant's prior year expenses (line 348) were $15,000. The tenant's lease agreement is subject to a cap percentage (line 350) of 6%. The cap percentage limits the amount that the tenant's expenses can increase from year to year. 6% of $15,000 is $900. Therefore, the most that the tenant can be required to pay in expenses in the current year is $15,900. Therefore, the capped amount (line 354) of expenses that the tenant is required to pay for the year is $15,900.

The previously billed total (line 356) indicates the total amount of estimated payments that the tenant paid for the year. The tenant paid $15,600 in estimated payments for the year. The balance due (line 358) is equal to the capped amount (line 354) minus the previously billed total (line 356). In the example illustrated in FIG. 2, the tenant has a balance due of $300.

Figure 4:
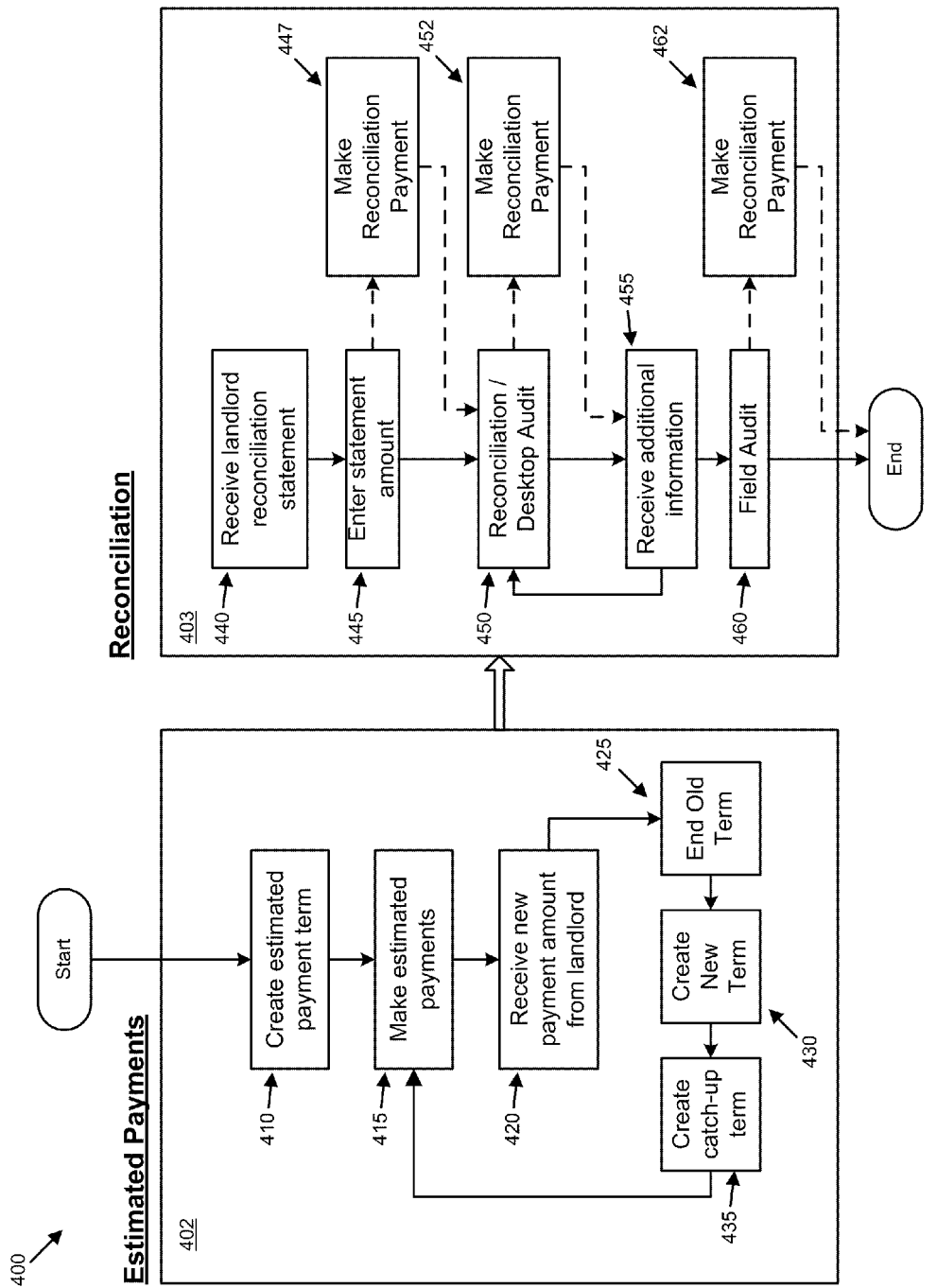
FIG. 4 is a high level flow diagram of a method for creating and applying estimated payments toward a tenant's share of operating expenses and for performing a reconciliation of an actual amount of operating expenses billed to the client by the landlord during a reconciliation period according to an embodiment of the present invention.

FIG. 4 is a high level flow diagram of a method 400 for making estimated payments toward a tenant's share of operating expenses and for performing a reconciliation upon receipt of a reconciliation statement from the landlord according to an embodiment of the present invention. Method 400 may be performed by software (e.g. program code, instructions) executed by a processor, by hardware, or a combination thereof.

Upon receiving a reconciliation statement from the landlord, a tenant typically analyzes the statement to check the expenses that were passed down to the tenant by the landlord. Three levels of analysis are commonly applied: (1) basic reconciliation, (2) a desktop audit, and (3) a field audit. A basic reconciliation comprises comparing the actual expenses that were billed to the tenant to the sum of the estimated payments made by the tenant to the landlord to make sure that the estimated payments have been properly reconciled. A desktop audit is a more in-depth analysis of the information included on the reconciliation statement. The desktop audit is so named because the audit includes information that may ideally be investigated, recalculated, and confirmed from one's desk. For example, the tenant may call the landlord to confirm information in the reconciliation statement. The tenant may also conduct a field audit where the tenant reviews the landlord's books to confirm that the reconciliation statement accurately reflects the landlord's actual expenses for the reconciliation period.

Method 400 is divided into two phases: estimated payment cycle phase 402 and reconciliation phase 403. During estimated payment cycle phase 402, the tenant makes estimated payments to the landlord to cover the tenant's estimated share of the operating expenses for the reconciliation period. In reconciliation phase 403, the landlord provides a reconciliation statement that includes a detailed listing of the various operating expenses that are included in the tenant's share of the operating expenses, and including calculations that indicate how the total charge owed by the client has been calculated. The landlord typically will have all of the information, such as utility invoices, required to determine the actual operating expenses for the reconciliation period by the end of the period, and using this information the landlord calculates the tenant's share of the operating expenses. Once the landlord has determined the portion of the operating expenses to be attributed to the tenant, the landlord creates the reconciliation statement and provides the statement to the tenant.

The reconciliation statement will typically include any estimated payments made by the tenant (if any), the sum of which will be deducted from the tenant's share of the operating expenses to arrive at an amount due that the tenant owes the landlord (if the sum of the tenant's share of actual operating expenses for the reconciliation period exceeds the sum of the estimated payments made by the tenant). If the sum of the estimated payments exceeds the actual amount, the reconciliation payment may reflect a credit balance, indicating that the landlord may owe the tenant a refund for the amount of the credit balance.

During reconciliation phase 403, the tenant may perform one or more levels of reconciliation (basic reconciliation, desktop audit, and/or field audit) to identify discrepancies between the expected amount of operating expenses (as determined from the operating expense-related lease agreement and/or any amendments to the operating expense-related agreed upon by landlord and tenant).

Method 400 begins with estimated payment cycle 401. Prior to the beginning of the estimated payment cycle, the landlord and tenant have entered into a lease agreement, and various critical dates such as the start and end of the reconciliation period, the date that the landlord is supposed to provide the reconciliation statement to the tenant, and when reconciliation and/or estimated payments are due may have been agreed upon. The landlord may periodically revise the landlord's operating budget, which may, in turn, cause the landlord to revise the estimated payment amounts to be paid by tenants.

Estimated payment cycle beings with step 410, where the tenant creates an estimated payment term. An estimated payment term defines one or more estimated payments to be made by the tenant over a period of time to toward the tenant's share of the operating expenses. Estimated payments are payments made by the tenant (and typically made payable to the landlord). The estimated payments are merely an estimate of the tenant's share of the operating expenses for a portion of the lease period. The actual portion of operating expenses to be attributed to the client is not determined until the end of the reconciliation period when the landlord creates the reconciliation statement.

When creating the estimated payment term, the tenant may specify a payment frequency that indicates how often estimated payments are to be made to the landlord (if a series of estimated payments are to be made) and a payment amount indicating how much is to be paid with each estimated payment. An estimated payment term will also be associated with a particular operating expense agreement in a lease. According to one embodiment of the present invention, estimated payment terms may be created via "estimated payments" interface 900 of the "lease agreement" component 110 described below.

The frequency and the amount of estimated payments may vary. Often, the lease agreement specifies the frequency of the payments, and sometimes the amount of each estimated payment that the tenant is initially required to make. But, periodically (often annually), the landlord may change the estimated payment amount that the tenant is to pay the landlord based upon revisions to the landlord's operating budget. In optional step 420, the landlord informs the tenant that the tenant is liable making estimated payments to the landlord for a different amount. In response to the tenant receiving the new estimated payment amount that the tenant is to pay to the landlord, the existing payment term is terminated (step 425), and the tenant creates new payment term using "estimated payments" component 115, where the new estimated payment term specifies one or more estimated payments to be made by the tenant for the new estimated payment amount received from the landlord (step 430).

In some instances, an estimated payment amount may be retroactive, meaning that the effective date of the new payment estimated payment amount occurs in the past. Retroactive payment amounts may occur where the landlord periodically revises the landlord's operating budget. If, for example, one or more of the operating expenses paid by the landlord increases prior to the landlord revising the operating budget, the landlord may revise the estimated payment amount that the tenant is to pay to the landlord to reflect the tenant's proportionate share of the increase in the operating expenses.

Because the new estimated payment amount may have an effective date that is in the past, the tenant may have made one or more estimated payments at the old estimated payment amount. The tenant, therefore, owes the difference between the old estimated payment amount and the new estimated payment amount for each of the estimated payments that the tenant made to the landlord at the old estimated payment amount since the effective date of the new estimated payment amount. To make up for the difference between the old and new estimated payment amounts, a catch up payment term may be created (step 435). A catch-up payment term may be used to make one or more payments to the landlord for the difference between the old and new estimated payment amounts. If a new payment term is created (step 430), processing continues with step 415, where estimated payments will be made by the tenant for the new estimated payment amount provided by the landlord.

At the end of the reconciliation period, processing related to reconciliation phase 403 is performed. The length of the reconciliation period may vary from lease to lease. Reconciliation is typically performed on an annual basis, but depending upon the terms of the lease, reconciliation may be performed more or less frequently. As described above, at the end of the reconciliation period, the landlord generates a reconciliation statement, which is then sent to the tenant. When the tenant receives the reconciliation statement (step 440), the tenant enters the amount due from the reconciliation statement into an interface of reconciliation component 120 of the property management system 100 (step 445). If the amount due is greater than zero, this indicates that the tenant's share of the operating expenses for the reconciliation period (as determined the landlord and provided on the reconciliation statement), is greater than sum of the estimated payments that the tenant made during the reconciliation period. The tenant may elect to make a reconciliation payment to the landlord for the amount due provided on the reconciliation statement (step 447).

A reconciliation payment is a payment for the difference between the tenant's portion of the landlord's actual operating expenses for the reconciliation period (as determined by the landlord) and the amount the tenant has paid in estimated payments and/or catch-up payments for the reconciliation period. Reconciliation payments may be created using a reconciliation interface, such as the reconciliation interface of a property management system embodiments depicted in FIGS. 11-15 and described below.

A tenant typically will have a limited period of time (an audit period) in which to perform a reconciliation after receiving the reconciliation statement from the landlord, and to make payments to the landlord or to demand credits back from the landlord if the tenant has overpaid. Initially, the tenant may elect to make a reconciliation payment to the landlord if the reconciliation statement indicates that an additional payment is due, while deferring performing a detailed reconciliation check to a later time. However, it is very important that the tenant complete the reconciliation check before the expiration of the audit period. In most cases, if a tenant fails to perform the reconciliation check prior to the expiration of the audit period, the tenant will no longer be able to challenge the expenses on the reconciliation statement prepared by the landlord. Therefore, it is important that the tenant determine the accuracy of the reconciliation statement in a timely fashion.

Method 400 continues with step 450, where a desktop analysis of the reconciliation statement may be performed by comparing the amounts of expenses billed to the tenant by the landlord to the provisions of the lease agreement to ensure that the tenant has not been billed in excess of what is allowed under the lease agreement. As described above, during the desktop audit, the tenant investigates, recalculates, and confirms the information provided in the reconciliation statement. Embodiments of the property management system described herein facilitate the desktop audit process by providing a reconciliation interface for capturing information from the reconciliation statement (see FIGS. 11-15 described below) and a dynamically generated review reconciliation interface that provides a side-by-side comparison of operating expenses attributed to the tenant on the reconciliation statement to the tenant's expected share of operating expenses based upon terms of the lease agreement (see FIG. 15 described below).

If, as a result of the audit/reconciliation process, the tenant determines that the sum of the estimated payments made by the tenant is less than the portion of the operating expenses attributed to the tenant on the reconciliation statement, the tenant may make a reconciliation payment equal to the amount of the difference between the sum of the estimated expenses and the portion of the operating expenses attributed to the tenant in the reconciliation statement (step 452). Method 400 continues with step 455.

The tenant may receive additional information from the landlord during the reconciliation process (step 455) that enables the tenant to perform a more detailed reconciliation. For example, the tenant may ask the landlord for an explanation for why a particular expense, such as insurance, landscaping, or utilities increased significantly, or a particular line item on the reconciliation statement may be unclear or ambiguous so that the tenant might determine whether the tenant should be obligated to share in the expense. The tenant might also, for example, question the calculation of the total area and/or the occupied area of the property, which may be used in determining the tenant's pro rata share of some expenses. The reconciliation and auditing process may be iterative as result. If additional information is received, then the method 400 returns to step 450. Otherwise, method 400 continues with step 460.

At step 460, a field audit is performed. During a field audit, the tenant reviews the landlord's records to determine if the expenses that have been passed on to the tenant are legitimate. After the field audit, the tenant may make a reconciliation payment (step 462), if the amount of actual expenses attributed to the client exceed the sum of estimated payments made to the landlord. Method 400 terminates after step 462.

According to some embodiments of the present invention, step 460 is optional and might not be performed by the tenant. For example, a tenant may need to perform reconciliation processing for a large number of properties and decide that a field audit is not necessary for all of the properties, or the results of the desk top reconciliation may have satisfied the tenant that the information on the reconciliation statement is correct.

Interfaces for Capturing Lease Provisions

According to an embodiment of the present invention, a lease agreement component is provided to facilitate collection of information for operating expense-related provisions of a lease agreement. FIGS. 5-10 illustrate various interface of a lease agreement component according to an embodiment of the present invention. The information collected in the lease agreement component is used to calculate the tenant's share of the operating expenses for the reconciliation period, given the landlord's actual expenses for the period. The lease agreement component may, for example, be used in conjunction with methods 100 and 200 described above.

FIG. 5 is an illustration of a method details interface 500 of "method details component" 111 according to an embodiment of the present invention. Method details interface 500 provides an interface for receiving and displaying information regarding how estimated operating expenses are to be calculated and reconciled. Interface 500 may provide various elements (e.g., menus, dropdown lists, text entry boxes) that enable a user to input information. In one embodiment, as depicted in FIG. 5, method details interface 500 may be displayed by selecting a tab in the lease agreement component corresponding to the interface. One skilled in the art will recognize that other types of interfaces may also be used in other embodiments of the present invention.

"Reconciliation frequency" list 501 is a dropdown list from which the tenant may select a frequency at which reconciliations are to be performed for a lease agreement. For example, reconciliations may be performed annually, quarterly, monthly, semi-annually, bi-annually or other predefined intervals. The frequency at which reconciliations are to be performed may vary from lease agreement to lease agreement.

"Expense year ends in" list 502 comprises a dropdown list that enables the tenant to select the month in which the reconciliation period ends. Just as reconciliation periods may vary, the month in which a reconciliation is to be performed may also vary. Together the reconciliation frequency 501 and the month that the expense period ends in list 502 establish the pattern for payment and reconciliation cycles.

"Credit against" dropdown list 503 enables the tenant to select from a list of options that define how an overpayment made by the tenant may be credited to the tenant's accounts. Overpayments may occur, for example, if the sum of estimated payments paid by the tenant exceeds the actual expense incurred by the landlord during the reconciliation period. Lease agreements often restrict how the tenant may apply a credit for an overpayment. Often these credits cannot be applied to any charge. According to an embodiment of the present invention, "credit against" dropdown list 503 includes three options: "this agreement only," "operating expense agreements only," and "all charges." If "this agreement only" is selected, then credits for overpayments may only be applied against future charges associated with the same operating expense agreement. Effectively, this means that the tenant may take the credit against any estimated payments that the tenant is to making on the agreement. Thus, if the credit is larger than the amount of monthly estimated payments, the credit may be recaptured over several months. If the "operating expense agreements" option is selected, then the tenant may take the credit against any estimated payments that they tenant is making for any operating expense agreement that is in effect. The tenant and landlord may enter into multiple operating expense agreements concurrently to cover various operating expenses associated with the operation of the property. If the "all charges" option is selected, then credits for overpayments may be taken against all charges, including base rent. This latter option effectively enables the tenant to immediately take the credit, because the credit is not limited to operating expenses as in the first two options. One skilled in the art will recognize that other options for applying credits may be provided by other embodiments of the present invention.

"Administration fee" checkbox 511 may be used to indicate whether the landlord charges an administration fee for administering the tenant's account. Some landlords may charge an administration fee equal to a percentage of the operating expenses for a reconciliation period in order to recover administrative costs associated with managing the property. The tenant's pro rata share of this fee must be paid by the tenant along with the pro rata share of the other expenses. If the landlord charges an administration fee, admin fee checkbox 511 may be checked, and the percentage of the operating expenses that the landlord charges as an administrative fee may be entered in "fee percent" field 512. According to some embodiments, the landlord may charge flat fee comprising a fixed amount rather than a percentage of expenses.

"Taxable" checkbox 513 may be used to indicate whether taxes are payable on the operating expense charges associated with the lease agreement. Some types of operating expenses may have taxes associated with them, such as sales tax, and/or other types of taxes, such as value added tax (VAT). Checkbox 513 is checked to indicate that tax is payable on the operating expenses related to this lease agreement. Checkbox 513 is purely informational. According to some embodiments, the taxes associated with the operating expenses may be determined by the property management system, while in other embodiments, the taxes associated with the operating expense may be determined by the landlord and provided to the tenant on the reconciliation statement.

"Caps and minimum" checkbox 514 may be checked to indicate that some of the operating expenses related to the lease agreement are subject to maximum or minimum constraints. Caps place an upper limit on the amount that the tenant has to pay for a particular expense or type of expenses. For example, in some lease agreements, the amount of CAM expenses that landlord may pass on to a tenant may be capped or limited. As an example, a lease agreement may include a cap on CAM expenses that defines a maximum amount that the CAM expenses may increase from year to year. Minimums place a lower limit on the amount that a tenant has to pay for a particular expense or type of expense. For example, a lease agreement may include a provision that requires the tenant to pay $10,000 per month for CAM expenses, even if the tenant's pro rata share of the actual expenses for the month was less than $10,000.

"Caps Applied" dropdown list 515 allows the tenant to select from a list of options that indicate when a cap is applied. If the lease agreement includes provisions for both caps and administration fees, the tenant may select whether the caps or the administration fees are to be applied first when calculating the tenant's estimated share of the operating expenses. If administration fees are applied to the account before the cap, the cap will be applied to the total of expenses plus administration fees. If the administration fees are applied after the cap, then the cap will be applied to the expenses first, and the administrative fee amount will be calculated as a percent of the capped expenses.

According to some lease agreements, only operating expenses over a specified stop amount are collected by the landlord. "Stop" dropdown list 521 enables the tenant to select a type of stop: (1) fixed amount or (2) base year. If "fixed amount" is selected, the stop amount is entered into the "base year amount" field 522 (when the amount is known), and the "units" field 523 is set. If "base year" is selected, the stop amount is determined based upon provisions of the lease agreement. Each lease agreement may define "base year" stops slightly differently, and "Method details" component 111 determines, based upon the lease agreement information entered by the tenant, the value for "base year amount" field 522, and selects a value for "units" field 523 when "base year" is selected as the type of stop. For both types of stops, the base year amount acts as a floor for the amount of operating expenses from which the landlord will collect a pro rata share from the tenant. For example, if the base year amount were equal to $300,000, and the landlord's actual operating expenses were $315,000, the landlord would only collect the tenant the tenant's pro rata share of $15,000 (the amount of the landlord's operating expenses in excess of the $300,000 base year amount).

If the operating expenses are supposed to be grossed up, then gross up checkbox 524 may be checked. The gross-up fields enable the tenant to capture gross-up information so that the information is available in the property management system at the time that the reconciliation is performed. Gross up provisions in a lease agreement allow the landlord to "gross up" operating expenses. Grossing up the operating expenses enables the landlord to overstate the tenant's proportionate share of operating expenses that are based upon the occupancy of the property in the event that the property is not fully occupied. For example, utilities, trash removal, management fees, janitorial services, and/or other operating expenses that vary based upon the occupancy of the property may be grossed up by the landlord. In contrast, fixed expenses, such as taxes or insurance, do not vary depending upon the occupancy of the property, and thus, should not be grossed up in the event that the property is not fully occupied. If a property is fully occupied, the gross up provisions are not triggered, and the tenant's proportionate share of the operating expenses is determined using the standard calculations. However, if the tenancy drops below 100% during the course of the lease agreement, the gross up provisions may take effect.

"Base year percentage" field 525 and "subsequent year percentage" field 526 are used to capture the base year percentage and the gross up percentage for subsequent years. The base year percentage is a percentage used to determine the tenant's proportionate share of the operating expenses subject to grossing up, if the occupancy falls below 100% during the first year of the lease. The subsequent year percentage is a percentage used to determine the tenant's proportionate share of the operating expenses subject to grossing up, if the occupancy falls below 100% during years following the first year of the lease. If the lease agreement includes gross up provisions, the values for "Base year percentage" field 525 and "subsequent year percentage" field 526 may be taken directly from the gross up provisions of the lease agreement.

After setting up the reconciliation method details on method details interface, the tenant may continue capturing the expense related provisions of the lease agreement information in pro rata basis details interface 600.

FIG. 6 is an illustration of a "pro rata basis details" interface 600 of "pro rata basis" component 112 according to an embodiment of the present invention. "Pro rata basis details" interface 600 provides an interface for entering information that may be used to determine the tenant's proportional share of the operating expenses. Pro rata basis interface 600 is illustrated as a tab in the lease agreement component. One skilled in the art will recognize that other types of interfaces may also be used in other embodiments of the present invention.

For most lease agreements, a single pro rata basis is generally defined for determining the tenant's proportional share of all of the operating expenses that the tenant is required to pay according to the lease agreement. However, some lease agreements may specify different pro rata bases for different types of expenses. For example, a lease agreement may specify that the tenant is required to pay a percentage of operating expenses related to building maintenance of a shopping mall based upon square footage of the area of the property that the tenant occupies compared to the overall square footage of the occupied areas of the mall (including areas occupied by all of the tenants), and the tenant is required to pay a portion of the cost of insuring the leased property proportionate to the square footage of the area that the tenant occupies compared to the square footage of the occupied areas of the mall after the square footage of areas occupied by anchor tenants has been subtracted from the occupied area.

A pro rata basis type may be selected from "pro rata basis" dropdown list 601. According to an embodiment of the present invention, the pro rata basis types include: fixed percentage, gross leasable area, occupied area, occupied area with floor, and pro rata share of sales. Under the fixed percentage pro rata basis, the tenant is responsible for a predetermined percentage of the operating expenses, such as CAM expenses, regardless of factors such as occupancy of the property and/or the square footage occupied by the tenant. Under the gross leasable area pro rata basis, the tenant is responsible for a proportional share of the operating expenses determined by dividing the square footage occupied by the tenant by the gross square footage of the property as a whole. Under the occupied area pro rata basis, the tenant is responsible for a proportionate share of the operating expenses determined by dividing the tenant's occupied square footage by the total occupied square footage for the property (includes square footage occupied by other tenants). Under the occupied area with floor pro rata basis, the tenant is responsible for a proportionate share of the operating expenses determined the same way as for the occupied area pro rata basis, but the tenant's pro rate share is limited by a floor value that sets the minimum value for occupancy percentage to be used for calculating the pro rata share for which the tenant will be liable. Under this method, if the actual occupancy percentage is lower than the negotiated floor percentage, the tenant's pro rata basis will be calculated as if the occupancy percentage were the same as the floor percentage. Under the pro rata share of sales pro rata basis, the tenant is responsible for a share of the operating expenses determined based upon the tenant's pro rata share of the mall's gross sales. According to some embodiments, for the various pro rata basis types described above, the occupancy percentages and the occupied areas used in determining the pro rata basis may be defined as an average, because the occupied percentages and the occupied areas may be changing throughout the reconciliation period. According to some embodiments, the occupied areas and/or the occupied percentages may be determined by taking an average of the occupied areas and/or the occupied percentages for the last day of each month of the reconciliation period. One skilled in the art will recognize that other methods may be used for estimating the occupied percentages and/or the occupied areas used to determine the pro rata basis.

"Pro rata basis details" table 603 provides inputs for capturing pro rata basis information from the lease agreement. The Pro Rata Basis Notes" table 621 provides inputs for entering notes to annotate the pro rata basis details. Notes entered via notes table 621 are available to the tenant during the reconciliation process, and provide the tenant with reference information describing a pro rata basis. Each interface of the property management system includes a notes table and the notes are accessible throughout the reconciliation process. The notes are categorized by subject based upon the interface through which the notes were entered.

"Pro rata basis details" table 603 may be used to create a new pro rata basis of the type selected in pro rata basis type dropdown list 601. Every pro rata basis is assigned a name via "pro rata basis name" field 604 in order to identify the pro rata basis. "Pro rata percentage" field 605 provides an input for storing the pro rata percentage basis only if "fixed percentage" pro rata basis type is selected in pro rata basis type dropdown list 601. Tenant area field" 606 provides an input for the square footage expected to be occupied by the tenant, and "total area" field 607 provides an input for entering the total area of the property. "Total area type" dropdown list 608 is associated with the "total area" field 607 and provides a list of area types that indicate how the total leasable area entered in "total area" field 607 is determined. For example, the total area may comprise the total leasable area of the property, and the total area to be used in determining the pro rata basis may be determined by summing up all of the leasable area for the property including the area occupied by the tenant. Alternatively, the total leasable area to be used in determining the pro rata basis may be determined by subtracting the area of portions of the property occupied by anchor tenants from the total leasable area of the property. "Floor percentage" field 609 may be used to input a minimum occupancy percentage to be used with a pro rata basis type of Occupied Area with Floor. The floor percentage indicates a minimum Occupancy percentage to be used to determine the tenant's pro rata basis. "Delete entry" icon 610, if selected, removes an entry from "pro rata basis details" table 603.

Some of the values associated with the pro rata share may be included in the lease agreement, while others may not be available until end of the reconciliation period, or, in some instances, may change during the course of the reconciliation period. Some values that are typically fixed include the fixed percentage for fixed percentage basis, tenant area and floor percentage. The tenant area might change during the course of the reconciliation period if the tenant occupies additional square footage. Values such as gross sales and total occupied area usually change from reconciliation period to reconciliation period and must to be entered at the time of reconciliation. Values for occupied area or gross sales are never written into the lease provisions. Once the pro rata basis details have been entered, the tenant may define expense groups via expense group details interface 700.

FIG. 7 is an illustration of an expense group details interface 700 of "expense groups" component 113 according to an embodiment of the present invention. Expense group details interface 700 may be used to capture information for various types of expenses for which the tenant is responsible according to the lease agreement. The expense group details interface 700 is illustrated as a tab in the lease agreement component. One skilled in the art will recognize that other types of interfaces may also be used in other embodiments of the present invention.

Expense details interface 700 comprises expense group table 701 and notes table 721. Expense group table 701 provides inputs for defining expense groups. Expense groups are used to define various types of expenses that appear in the operating expense recovery provisions of the lease agreement. For example, the tenant may create a "CAM expenses" expense group for common area maintenance and expenses or a "security" group for tracking security related expenses. Expense groups are used during the reconciliation process for grouping the expenses that appear on the reconciliation statement. Expense group name field 702 provides an input for entering and displaying a name of an expense group. The expense group name may ideally be the similar to the name used in the lease agreement for the type of expense associated with the expense group to facilitate the reconciliation process Standard group name dropdown list 703 provides a list of tenant-defined categories to be associated with the expense group. For example, the tenant may create categories for insurance, landscaping or CAM expenses. The naming of similar expenses may vary from lease agreement to lease agreement, but the tenant-defined categories are consistent across all of the tenant's lease agreements. Thus, the tenant is able create cross-references between the expense groups associated with a lease agreement and tenant-defined categories that enable the tenant to compare expenses across the tenant's entire portfolio of lease agreements. This feature may be especially helpful, for example, for large national chain retailers that have a large number of lease agreements to manage.

Pro rata basis name dropdown 704 provides a list of the pro rata basis names entered via the pro rata basis name field 604 on pro rata basis interface 600, described above. A pro rata basis must be associated with the expense group to determine how the tenant's share of expenses associated with the expense group is to be determined.

Contribution checkbox 705 is checked to indicate a row that represents not an expense but rather a contribution. Contributions are payments made toward the landlord's operating expenses by a tenant or class of tenants (e.g., anchor tenants) that are deducted before the pro rata share of the operating expenses is determined for each of the other tenants. Thus, a contribution payment made by one tenant may decrease the pro rata share of operating expenses that each of the other tenants may be required to pay. For example, an anchor tenant (a main tenant in a commercial property), may make a contribution payment toward CAM expenses. The amount of the anchor tenant's contribution payment would then be deducted from the total CAM expenses before determining the pro rata share of the CAM expense, and the pro rata share of the CAM expenses for each tenant would be determined from the remainder (if any) of the total CAM expenses after deducting the contribution payment.

Cap checkbox 706 is checked if expenses associated with the expense group are subject to a cap. Caps define limits on the amount of the tenant's share of operating expenses. Caps associated with the lease agreement are defined in caps interface 700 described below. If cap checkbox 706 is checked while setting up an expense group in the expense group detail interface 700, the expense group is subject to a cap.

Fee checkbox 707 is checked if the expense group is subject to administration fees. For example, the landlord may charge a tenant a management fee for administering some types of operating expenses such as CAM expenses and/or security-related expenses.

Multiple 708 stores a multiplier that indicates an adjustment to the pro rata share of the operating expenses associated with the operating group for which the tenant will be responsible. The value of the multiplier may be greater or lesser than one, and may any value greater than or equal to zero. A value of 1, which is the default value, means that the tenant will pay 100% of their pro rata share of the expense. A number less than 1 means the tenant will pay less than their pro rata share, while a number greater than 1 means the tenant will pay more than their pro rata share. A multiple may be used when the tenant's contribution to the cost or the benefit received from a service is not in alignment with the tenant's pro rata share based upon the space occupied by the tenant. For example, Food court tenants may have a multiple that is greater than 1 for expenses related to janitorial services, because the food court tenants presumably gain more of a benefit from the janitorial services needed to keep eating areas of the property clean than tenants that do not sell food. As another example, a bar that stays open until 2:00 am may have a multiple greater than 1 for expense related to security, while other tenants, such as department stores, that are not open so late may have a multiple that is less than 1. Thus the bar would pay more than its pro rata share of the expense based upon the area of the property occupied by the bar, while the other retailers may pay less than their pro rata share of the expenses related to security based upon the area of the property occupied by the department stores. Delete entry icon 709 enables the user to remove the entry from the expense group table 701.

If the agreement includes taxable expenses (indicated by checking taxable checkbox 713 on the method details interface 500), a taxable checkbox (not shown) will be included in each row of expense group table 701. Checking the taxable checkbox indicates that the expense group is comprised of taxable expenses.

Notes table 721 provides an interface for creating and viewing annotations and reference information regarding the expense groups. The interface of notes table 721 may be similar to that pro rata basis notes table 521, described above. The annotations and reference information created in notes table 721 is available throughout the reconciliation process.

FIG. 8 is an illustration of a caps interface 800 of "caps" component 114 according to an embodiment of the present invention. Caps interface 800 provides an interface for defining constraints (maximums and/or minimums) on the amount of operating expenses that a landlord may pass on a tenant. Caps interface 800 is illustrated as a tab in the lease agreement component illustrated in FIG. 8, but one skilled in the art will recognize that other types of interfaces may also be used in other embodiments of the present invention.

Caps interface 800 includes first year constraints section 801, subsequent year caps 831, subsequent years minimum 831, and caps notes table 841. First year constraints section 801 allows the tenant to enter constraints (maximums and/or minimums) that place limits on the amount of operating expenses that may be passed on to the tenant. First-year constraints are entered into the system as a fixed monetary amount or per-area monetary amount, and subsequent year constraints are entered as a percent change relative to either the first year amount or the previous year amount.

First year constraints section 801 includes units dropdown list 802 which enables the tenant to select whether the first year constraints are to be entered as an absolute amount or a per area amount. Per area amount indicates that the constraints are applied per unit of measure of the area occupied by the tenant during the course of the year. For example, the per area amount may be defined in terms of square feet or square meters. "Apply to" dropdown list 803 enables the tenant to select at what point in the calculation the constraints are to be applied. The constraints may be applied to the tenant's share of the operating expenses or may be applied to the landlord's operating expenses as a whole, before the calculation of the tenant's pro rata share.

Maximum field 805 provides an input for entering a maximum amount of operating expenses that the tenant may be liable for per unit selected in units dropdown list 802, and minimum field 806 is used to enter a minimum amount of operating expenses that the tenant may be liable for per unit selected in units dropdown list 802. For example, if the value of maximum field 805 is set to $3.05 per square foot, units dropdown list 802 is set to "amount per area," and the tenant occupies 10,000 square feet of the leased property, the maximum operating expenses that the tenant may be liable for during the first year would be $30,500 (10,000 square foot*$3.05 per square foot). As another example, if the value of minimum field 806 is set to $2.50 per unit, then the minimum operating expenses that the same tenant would be liable for would be $25,000 for the year (10,000 square foot*$2.50 per square foot). The foregoing two examples assume the constraint is applied to "Tenant Share".

The first year constraint terms described herein are merely exemplary. Commercial leases are often measured in multi-year terms, and the reconciliation period is often one year. However, one skilled in the art will recognize that according to other embodiments, the length of the first constraint period is not limited to one year and may be either shorter or longer in accordance with the needs of the landlord and with the terms of the lease agreement.

Constraints placed on expenses for years subsequent to the first year are relative to the expenses for the prior year. Subsequent year constraints section 821 provides for defining subsequent year constraints that are to be applied after the first year. Rate type dropdown list 822 enables the user to select how a rate increase percentage is derived for subsequent years. The rate increase percentage limits the amount that the operating expenses for which the tenant is liable may increase from year to year (or other reconciliation period). According to an embodiment of the present invention, the rate types include fixed percentage, index change percentage, or the greater or lesser of the fixed percentage and the index change percentage. If the fixed percentage rate type is selected, the rate of increase for an expense from year to year cannot exceed a fixed percentage rate (e.g. 5%). If the index change percent type is selected, the rate of increase for an expense is tied to a variable index specified in the lease agreement, and the rate increase from year to year cannot exceed a percentage based upon the variable index. As an example, the percentage of rate change may be tied to a consumer price index. If the rate of increase includes the greater of the fixed percentage and the index change percent, the rate of increase from year to year is limited by the greater of a fixed percentage rate or a percentage rate based upon a variable index. If the rate of increase includes the lesser of the fixed percentage and the index change percent, the rate of increase from year to year is limited by the lesser of a fixed percentage rate or a percentage rate based upon a variable index.

Basis type dropdown list 823 provides a list of options for how the cap applied. The cap may relative to the previous year or to a base year (which may in some instances be the first year of the lease agreement). Whether the cap is defined as being relative to the previous year or to a base year, the cap is defined as a maximum percentage increase over the operating expense charges for the previous year or the base year. The cap may also be relative to the actual amount of expenses for the previous year or the base year (prior to the expenses being capped) or may be relative to the constrained amount for the previous year or the base year (the tenant's share of operating expenses after the cap is applied). For caps relative to the base year, the cap may be defined as a compounding rate.

The Apply To dropdown list 824 enables the tenant to elect whether the cap is to be applied to the landlord expenses or to the tenant's proportional share of the operating expenses determined using the pro rata basis calculations defined in pro rata basis interface 500. Carryforward dropdown list 825 allows the tenant to select whether the lease agreement allows the landlord to carry forward overruns or savings to future years. If the tenant's pro rata share of operating expenses exceeds the cap for a reconciliation period, the landlord may carry the amount of the overrun forward to subsequent years. If the expense for a subsequent year are less than the cap amount, the landlord may add the amount that has been carried forward to the subsequent year's expenses (not to exceed the cap) and bill the tenant for the amount in the subsequent year. If the expense exceed the cap when the overruns are added, any excess over the cap amount may be carried forward to subsequent years. The landlord may also carry forward savings. If tenant's pro rata share of expenses are less than the cap, the landlord may carry forward the dollar amount of the difference between the tenant's actual pro rata share of the operating expenses and the cap amount. The savings that have been carried forward may then be applied toward a future year where a tenant's pro rata share exceeds the cap. The landlord may then bill the tenant more than the cap amount for that year, up to the amount of the carried forward savings. Any remaining savings may be carried forward to subsequent years. Thus, the landlord is sometimes able to bill the tenant for more than the cap amount in certain situations.

If the rate type is based upon a fixed percentage, then a percentage is entered into fixed percentage field 826. If the cap is based upon a fixed percentage, then the operating expenses may only increase by a percentage less than or equal to the fixed percentage.

If the cap is based upon an index, then an index name is selected from index name dropdown list 827, and an index finder month 828 indicates for which month the index's value is to be used. As an example, a consumer price index may be selected as the index. The index to be used is specified in the lease agreement.

Subsequent year minimum 831 subsection of caps interface 800 provides an interface for capturing information used to calculate a minimum amount of operating expenses for which the tenant may be liable in subsequent years. The subsequent year minimum subsection 831 is hidden in the illustration, but the tenant may expand the subsection by clicking on the header in order to enter data into the section.

Cap notes table 841 is also shown in the illustration in a hidden state. Cap notes table 841 provides an interface for creating and viewing annotations and reference information regarding the expense groups. The interface of notes table 841 may be similar to that pro rata basis notes table 621, described above. The annotations and reference information created in notes table 841 is available throughout the reconciliation process.

FIG. 9 is an illustration of an estimated payments interface 900 of "estimated payments" component 115 according to an embodiment of the present invention. Estimated payments interface 900 provides an interface for entering and displaying estimated payment information. Estimated payments may be made by the tenant throughout a reconciliation period and are applied toward the tenant's share of the operating expenses for the reconciliation period. The amount of estimated payments may be provide in some lease agreements, and/or may be provided to the tenant periodically by the landlord based upon the landlord's budget estimates for the reconciliation period.

Estimated payments interface 900 includes estimated payment frequency dropdown list 920, payment type dropdown list 921, payment purpose dropdown list 922, term template dropdown list 923, currency dropdown list 924, estimated payments table 931 and estimated payments notes table 941.

Before creating an estimated payment term, an estimated payment frequency is selected from estimated payment frequency list 920, a payment type is selected from payment type dropdown list 921, a payment purpose is selected from payment purpose dropdown list 922, a payment term template is selected from payment term template field 923, and a type of currency is selected from currency dropdown list 924. Estimated payment frequency list 920 comprises a list of predefined intervals for which an estimated payment may be created. For example, estimated payment frequency list 920 may include options for monthly, quarterly yearly and/or other payment frequencies. Payment type dropdown list 921 includes a list of predefined payment types that may be associated with the estimated payment term. For example, payment type dropdown list 921 may include a "CAM Expenses" payment type for indicating that an estimated payment is being made toward common area maintenance-related expenses or payment type dropdown list 921 may include an "Insurance" payment type for indicating that an estimated payment is being made toward insurance-related expenses.

Payment purpose dropdown list 922 enables the user to select a purpose for the payment from a list of predefined purposes. For example, the tenant may select "Operating Expense" from the list of payment purposes to indicate that the purpose of the payment is to pay the tenant's share of operating expenses.

Payment term template field 923 allows the user to enter the name or identifier of a payment term template. Payment term templates can be used to quickly set up an estimated payment term. A payment term template has values defined one or more of the values from the estimated payments interface 900 and when the user selects the template, estimated payments interface 900 is populated with the values from the template. Currency dropdown list 924 allows the user to select the currency in which the estimated payment is to be made. For example, the list might include U.S. Dollars, Euros, Yen and/or other types of currency in which the user may make a payment.

To create a new estimated payment term, add estimated payment button 939 is clicked and a new blank row is added to estimated payments table 931. Effective start date column 932 and start date column 933 default to the agreement start date and the end date column 934 defaults to the agreement end date. The start and end dates may be modified, but The effective start date column 932 must match the start date 933 for the first entry. A payment amount is entered in amount column 935. Annual amount 938 is determined from the payment amount entered in amount column 935 and the estimated payment frequency selected in estimated frequency dropdown list 920. For example, the first entry in estimated payments table 931 includes a payment amount of $2950 and the estimated payment frequency selected is monthly. Therefore, the annual amount of the estimated payments is $35,400 (12 months*$2950 per month).

An estimated payment term may end before the lease agreement terminates, because the landlord often readjusts the operating expense budget during the course of the lease agreement. Thus, the end date for an estimated payment term will default to the end date of the lease agreement, but the user can override this value with a different end date if the landlord changes the expected payment amount.

Once the estimated payment term data has been entered into estimated payments table 931, the estimated payment term may be saved in the property management system by clicking "save and create terms" button 940. Details of the newly created estimated payment term can be viewed by clicking the view estimated term button 928.

In addition to creating new estimated payment terms, estimated payments interface 900 also enables the tenant to revise an estimated payment amount in the event that the landlord changes the amount of estimated payments. For a typical lease agreement, the landlord may revise the estimated payment amount on an annual basis (for example, to adjust for inflation), but such a revision may occur at any time. When the tenant receives a notification of a change in an estimated payment amount, the tenant may enter the revised amount in the estimated payments table 931 by adding a new row to the table by clicking "add estimated payment" button 939.

The value of effective date column 932 of the newly added row is defaulted to an effective date that is determined using the date that the row is added and information about the reconciliation cycle associated with the lease agreement. For example, the effective date for the estimated payment term may default to January 1st of the current year if lease agreement has an annual reconciliation cycle.

The value of start date column 933 is defaults to the first day of the month following the last approved estimated payment item or the effective date from effective date column 932, whichever is later. The value of end date column 934 defaults to the end date of the lease agreement. The default values of effective date column 932, start date column 933, and end date column 934 will be correct for most instances, but may be modified by the tenant if the dates are not correct.

A new estimated payment term may be retroactive in some instances. For example, the landlord may change the estimated payment amount effective at the beginning of the year, but the tenant may not receive the notification of the change until several months into the year. Retroactive changes to payment terms may be implemented by setting an effective date for the estimated payment terms to a date in the past. For example, in the second row of estimated payments table 931, the effective date (column 932) of the estimated payment is defaulted to Jan. 1, 2009 and the start date (column 933) is defaulted to Mar. 1, 2009. The effective date of the estimated payment may have defaulted to Jan. 1, 2009 if the reconciliation cycle information indicated that a new reconciliation cycle began on Jan. 1, 2009. Since the new estimated payments received from the landlord were retroactive to the beginning of the year, the default effective date of Jan. 1, 2009 is correct. The start date defaulted to Mar. 1, 2009, which indicates that the estimated expense payments have already been approved and processed for January and February of 2009. However, the January and February payments were made at the old payment amount (column 935) of $2950 rather than the new payment amount of $3065. Therefore, a catch-up payment will be required to cover the discrepancy between the old and new payment amounts for the first two months of 2009. The property management system automatically calculates a catch-up amount based upon the difference between the old payment amount and the new payment amount for January and February. The difference per month between the amount paid under the old payment term and under the new term is $115. Therefore, the catch-up payment amount is $230.

After entering the new term information, the information is saved to the property management system by clicking save and create terms button 940. Once the term information has been added and saved, the estimated payment information may be viewed from the estimated payments interface 900. Upon saving the data, the property management system automatically generates two new draft terms according to the data entered: the new estimated payment term for $3065 and a catch up payment term for $230.

When the newly created estimated payment term and the one-time catch-up term are approved, then property management system will automatically set the end date (column 934) of the estimated payment term that was previously effective (if any) to be one day before the start date of the newly created payment term. In the example, this would be 28 Feb. 2009. The end date (column 934) of the newly created payment term defaults to the end date when the lease agreement expires.

As the tenant continues to modify estimated payments over the life of a lease agreement, the estimated payments table 931 provides a historical view of the estimated payment amounts that have been paid throughout the life of the agreement that the tenant may use to track changes in the estimated payment amounts over time.

Estimated payments notes table 941 functions similarly to the various other notes tables described, such as pro rata basis notes table 621. Estimated payments notes table 941 allows the tenant to enter annotations regarding the estimated payments that will be available throughout the reconciliation process.

FIG. 10 is an illustration of a critical dates interface 1000 of critical dates component 116 according to an embodiment of the present invention. Critical dates interface 1000 provides an interface for defining rules for four dates that are critical to the reconciliation process: (1) the audit period end date; (2) the date that notification of an estimated payment amount change is due from landlord; (3) the reconciliation payment due date; and (4) the date that the reconciliation statement due from landlord. Each of these dates is a recurring date. At the time that the lease agreement is established, the actual dates may not be known. However, most lease agreements specify the rules which define how to determine these dates.

Critical dates table 1001 provides inputs for setting up the rules associated with determining the four critical dates. Critical date column 1002 identifies which date is associated with a row in critical dates table 1001. For each of the critical dates, the tenant may select a period, period type, relationship and event. In period column 1003, the user inputs a period. The units of the value entered in period column 1003 are indicated by the value selected in period type column 1004. Period type column 1004 comprises a dropdown list from which the tenant may select a period type, such as days, months, quarters (¼ of a year), or years. Event column 1006 comprises a dropdown list from which the tenant can select an event which is used as a reference for determining whether a period has begun. Relationship column 1005 is used to define the relationship of the even selected in event column 1006 to the beginning of the period defined in column 1003.

The audit period end date (row 1 of table 1001) indicates the end of the period of time that begins upon receipt of the reconciliation statement during which the tenant has the option to audit the landlord's records in order to determine whether the landlord has correctly determined the tenant's share of operating expenses. Under a typical commercial lease agreement, the tenant has the right to perform a field audit on the landlord's operating expenses by auditing the landlord's records for a fixed period of time after receiving the reconciliation statement from the landlord. Field audits may turn up discrepancies between what the landlord billed the tenant and what the tenant's share of the expenses actually should have been. The field audit may be performed many months after the tenant receives the reconciliation statement from the landlord. However, the field audit typically must be performed within a predefined time after the landlord provides the reconciliation statement to the tenant. Otherwise, the tenant loses the right to audit the landlord's records. Missing the opportunity to audit the landlord's expenses could cost the tenant a large amount in overpayments for operating expenses. Therefore, it is crucial that the tenant have the ability to track the end of the audit period date so that the opportunity to perform an audit, if desired, is not missed.

For example, the audit period end critical date (first row of table 1001) indicates when the period in which the tenant is entitled to audit the landlord's expenses. If the tenant is entitled to audit the landlord's expenses up to 18 months after the landlord delivers the reconciliation statement, the tenant enters 18 in period column 1003, and selects months from the dropdown list in period type column 1004. The event from which the audit period end date is calculated is the receipt date of the reconciliation statement, so "statement receipt" is selected from the dropdown list in event column 1006. If the tenant selects "after" in relationship column 1005 for the "audit period end" critical date the value and selects "statement receipt" in event column 1006, then the audit period end critical date is determined to be 18 months after the reconciliation statement is received from the landlord.

The date that an estimated payment amount is expected from the landlord (row 2 of table 1001) indicates when an estimate of the tenant's operating expenses is expected to be provided by the landlord. The landlord may periodically provide the tenant with an estimated payment amount that reflects an estimate of tenant's share of operating expenses so that the tenant may make estimated payments throughout the reconciliation period.

The reconciliation payment due date (row 3 of table 1001) indicates by which the tenant must make a reconciliation payment in response to the reconciliation statement. According to an embodiment of the present invention, if the tenant has a credit balance at the time that the reconciliation statement is generated (e.g. due to estimated payments that exceeded the tenant's actual share of the operating expenses for the reconciliation period).

The date that the reconciliation statement due from landlord (row 4 of table 1001) indicates that date by which the landlord is obligated to provide the reconciliation statement to the tenant. This date is typically defined in the provisions of the lease agreement.

According to an embodiment of the present invention, additional critical dates beyond the four critical dates described above may be added to the property management system and tracked for a particular lease agreement.

Once the operating expense-related provision of the lease agreement have been entered into the lease agreement component, the basic data required to perform a reconciliation at the end of the reconciliation period should have now been captured in the property management system. At the end of the reconciliation period, the landlord generates a reconciliation statement and provides the reconciliation statement to the tenant, which indicates the tenant's pro rata share of the expenses for the reconciliation period, including any outstanding amount owed by the tenant. The tenant may then simply pay the amount due on the reconciliation statement or may perform a detailed audit to identify any discrepancies between what the tenant expected owe and the pro rata share of operating expenses that the landlord has determined for the tenant.

Reconciliation Processing—Desktop Audit

As described above, after receiving a reconciliation statement from the landlord, the tenant may perform one or more types of audits, including a basic reconciliation, a desktop audit, and/or a field audit. The property management system includes a reconciliation component that facilitates the tenant's performing of basic reconciliation and the desktop audit, which can be an extremely complex process. The reconciliation component provides an interface for capturing information from the reconciliation statement provided by the landlord and for identifying discrepancies between the information the reconciliation statement and the tenant's expected values for components of the calculation of the tenant's share of operating expenses for the reconciliation period. The tenant's expected share of the operating expenses, that is, the value the tenant believes to be correct, may be determined using the information capture by the lease agreement component of the property management system illustrated in FIGS. 5-10 plus information from the landlord's reconciliation statement and from other sources.

FIGS. 11-14, described in detail below, illustrate an interface for the reconciliation component of the property management system that may be used capturing information from the reconciliation statement according to an embodiment of the present invention. FIGS. 15 and 16, also described in detail below, illustrate a reconciliation summary interface that enable the tenant to perform a basic reconciliation and a detailed desktop audit of the information provided on the reconciliation statement. As described above, a basic reconciliation is a comparison of the amount paid by the tenant over the course of the reconciliation period with the amount owed as indicated on the reconciliation statement. The desktop audit, in contrast, is a much more in depth audit to that is performed to verify the contents of the reconciliation statement. The desktop audit involves reviewing information from the tenant's records, and may include gather additional information from the landlord and/or others in an attempt to verify the accuracy of information included on the reconciliation statement.

Much of the information provided by the reconciliation component is dynamically generated based upon operating expense-related information captured by the lease agreement component of the property management system. The layout of the review reconciliation provides a comparison of information received on the reconciliation statement with information that the tenant entered into the property management system via the lease agreement component described above and, for each reconciliation period, from the landlord statement and other sources. Discrepancies between the information provided by the landlord and the information entered into the lease agreement component are highlighted to enable the tenant to identify at a glance differences between the information provided on the reconciliation statement and information entered in the lease agreement component of the property management system.

The reconciliation component also highlights differences in calculated values and key-entered values between the landlord statement and the tenant's expectation of the correct value. In particular, if there is a discrepancy between the tenant's share of operating expenses as determined by the landlord (and provided on the reconciliation statement) and the value the tenant expects, or presumes to be correct, this discrepancy is highlighted, along with discrepancies in any antecedent value or calculation, making it easy to identify and demonstrate the ultimate source(s) of the discrepancy.

The reconciliation interface also supports a wide range of variations in how the tenant share is calculated and lays out each in logical fashion so that the tenant can understand at a glance how the tenant share has been calculated.

FIG. 11 is an illustration of an "overview and notes" interface 1100 of "overview and notes" component 121 according to an embodiment of the present invention. "Overview and notes" interface 1100 provides an interface for displaying reconciliation information and notes for a reconciliation. Overview and notes interface 1100 is illustrated as a tab in the reconciliation user interface. One skilled in the art will recognize that other types of interfaces may also be used in other embodiments of the present invention.

Reconciliation interface comprises a header 1101. Header 1101 enables the tenant to select reconciliation information to be viewed and/or edited and display information regarding reconciliation information that is being viewed in the reconciliation component. Header 1101 also enables the tenant to access reconciliation information that the tenant has previously entered into the reconciliation interface and saved. The tenant may create multiple revisions (versions) of reconciliation information. Each revision of the reconciliation information reflects the state of the reconciliation process at a specific point in time. According to an embodiment of the present invention, the tenant may only make revisions to the most recently created revision of the reconciliation information or create a new revision. Prior versions of the reconciliation information are read-only, providing a snapshot of the reconciliation at the point of time where the revision information was saved. Revisions may be used to provide a historical account of the changes that have been made to the reconciliation. The tenant may create a new revision for each change that is made to the reconciliation (such as an adjustment or payment).

Reconciliation information may be accessed by selecting a reconciliation in dropdown list 1102 and a revision of a reconciliation may be selected via switch revision dropdown list 1103. A new revision can be created by selecting "create new revision" from action dropdown list 1104. Alternatively, a reconciliation payment may be made by selecting "make reconciliation payment" from action dropdown list 1104. "Agreement name" field 1105 displays the name of the lease agreement that associated with reconciliation information displayed in the reconciliation interface and "agreement number" field 1106 displays the agreement number associated with the lease agreement. According to an embodiment of the present invention, the agreement name displayed in "agreement name" field 1105 and the lease agreement number displayed in "agreement number" field 1106 may be hyperlinks that, when activated, cause the lease agreement data associated with the reconciliation to be displayed. According to an embodiment of the present invention, a popup window comprising the lease agreement data entered via the lease agreement component may be displayed if the agreement name or agreement number hyperlinks are clicked. Therefore, the agreement is always available to the tenant throughout the reconciliation process.

"Period start date" field 1107 displays the start date for the reconciliation period. The period start date (except for the first reconciliation) defaults to the day following the end date of the previous reconciliation. According to an embodiment of the present invention, the "period start data" field 1107 is a read-only field and the start date for the reconciliation period is determined by the property management system and loaded into "period start data" field 1107 by default. "Period start data" field 1107 is a read-only field to prevent the tenant from accidentally missing a reconciliation by erroneously entering a bad value. "Period end date" field 1108 displays the end date for the reconciliation period. Unlike the period start date, the period end date may be modified by the tenant. The tenant may wish to modify the end date of the reconciliation period for a number of reasons. For example, a landlord may sell a property before the end of a reconciliation period and the tenant may wish to end the current reconciliation prior to the new landlord taking ownership of the property.

"Revision name" field 1109 enables the user to enter a name for a current revision of the reconciliation, and revision name field 1110 display a revision number associated with the revision. According to an embodiment of the present invention, the revision name may be populated by a default value such as "original," "revision 1," "revision 2," and so on, where the revision number automatically increments with each revision. "Reconciliation status" dropdown list 1111 is used to select a status for the reconciliation. For example, the reconciliation statuses might include "skipped," which indicates that the tenant has chosen to skip performing a desktop audit for the reconciliation period at this point (but may later return and perform the audit as long as the audit period has not expired), "not started," "in progress," or "complete." The reconciliation status provides an indicator as to the progress of a reconciliation at a glance. According to some embodiments, the tenant may add additional reconciliation statutes to "reconciliation status" dropdown list 1111 that map the specific reconciliation processed used by the tenant.

"Statement received" field 1121 provides an input for entering and displaying the date that the reconciliation statement was received from the landlord for a current reconciliation. "Statement amount due" field 1122 provides an input for entering and displaying the total amount due from the reconciliation statement (the amount owed by the tenant according to the landlord). "Reconciliation performed" field 1123 provides an input for entering and displaying the date that the reconciliation was performed. "Responsible person" field 1124 provides an input for entering and displaying an identifier of the person response for performing the reconciliation. The last updated field is a read-only field that displays the date that the reconciliation information was last updated.

"Audit status" dropdown list 1126 is used to indicate an audit status of the reconciliation. Auditor details provide identify whether an internal or external auditor performed an audit of the reconciliation information, including the landlord's expenses. The radio button next to "external auditor" field 1127 may be selected and the name or identifier of the external auditor may be entered in "external auditor" field 1127 if an external auditor is to perform an audit of the reconciliation information. If an internal auditor is to perform an audit of the reconciliation information, the name or identifier of the internal auditor may be entered into internal auditor field 1128 and the radio button next to internal auditor field 1128 is selected.

"Critical dates" table 1141 is provided to enter an override date for critical dates associated with the reconciliation period. Column 1142 includes a description of each of the critical dates, calculated date column 1143 includes a calculated value for the each critical date. The calculated value may be determined from the critical date information defined in "critical dates" interface 900 of a lease agreement component described above. "Override date" column 1154 enables the tenant to enter an override date for each of the critical dates.

"Reconciliation notes" table 1151 may be used to enter annotation to the reconciliation information as well as view notes added to the lease agreement via the lease agreement component (described above) and/or notes added to reconciliation information for past reconciliations. "View note type" dropdown list 1151 may be used to select the type of notes that may be displayed. For example, according to an embodiment of the present invention, "All" may be selected to display all notes associated with the lease agreement and the reconciliation, "Agreement" may be selected to display only notes related to the lease agreement, and "Reconciliation" may be selected to display only notes related to the reconciliation in the table. One skilled in the art will recognize that additional filters may be provided, such as "Caps," for filtering notes related to caps. "View reconciliation period" dropdown 1160 may be used to select notes for the current or a previous reconciliation period, thereby advantageously enabling the tenant to view notes from previous reconciliation periods while editing the reconciliation information for a current reconciliation period.

"Reconciliation notes" table 1151 comprises "subject" column 1152, "date added" column 1153, "user" column 1154, "type" column 1155, "reconciliation period start" column 1156, "reconciliation period end" column 1157, "update" column 1158, and "delete entry" column 1159. The contents of "subject" column 1152 provide a brief description of subject of the note. The subject of the note is editable for notes created using the reconciliation user interface. Notes created from the lease agreement component may be read-only according to some embodiments of the present invention. However, according to some alternative embodiments of the present invention, notes entered via the lease agreement component may be modified via "reconciliation notes" table 1151.

"Reconciliation notes" table 1151 provides a valuable source of information during the reconciliation process. For example, issues and questions related to the current reconciliation have often been encountered in earlier reconciliations or have been addressed in agreement notes. "Reconciliation notes" table 1151 advantageously enables the tenant to access these valuable sources of information directly from the reconciliation user interface.

Some tenants may have lease agreements for hundreds or thousands of different leased properties, and thus, may receive hundreds or even thousands of annual reconciliation statements from multiple landlords around the same time of the year. Often, due to the sheer volume of the statements received, the tenant cannot possibly analyze all of the statements received before the due date of the reconciliation payment. Overview and notes interface 1100 addresses this problem by enabling the tenant to create a quick payment to pay the amount due on the reconciliation statement at the time that the reconciliation statement is received and entered into the system. Thus, reconciliation payments can be quickly made in response to each of the reconciliation statements as the statements are received (and the tenant can avoid late payment charges by ensuring that reconciliation payments are made well before their due date).

"Overview and notes" interface 1100 enables the tenant to quickly create a reconciliation payment by filling out a few fields. "Statement received" date field 1121 may be filled in to indicate the date that the reconciliation statement was received, and "statement amount due" field 1122 may be filled in to indicate the amount due from the reconciliation statement. Other field values such as the period end date in "period end date" field 1108 may be filled in with default values by the system. The tenant may optionally modify these default values prior to the creating the reconciliation payment. When the tenant is finished entering the data required to create the quick payment, "Create new payment term" may be selected from action dropdown list 1104 and then Go button 1112 may be clicked to create a new payment term for the reconciliation payment. The reconciliation status in reconciliation status dropdown 1111 may be allowed to remain at "Not Started" to indicate that the tenant may return to the reconciliation later to analyze the reconciliation statement.

Typically, the audit period for a reconciliation statement extends well beyond the due date for the reconciliation payment, and the tenant may return to the reconciliation interface later to perform a detailed analysis of the reconciliation statement to determine whether the amount due on the statement accurately reflects what the tenant expects to pay according to the terms of the lease agreement.

FIGS. 12A, 12B, 12C, 12D, and 12E are illustrations of various layouts of a "reconciliation pro rata basis" interface of "pro rata basis" component 122 according to embodiments of the present invention. One skilled in the art will recognize that other types of interfaces may also be used in other embodiments of the present invention.

"Pro rata basis interface" 1200 is automatically configured to display a pro rata basis table customized for the type of pro rata basis that the tenant has defined in the pro rata basis interface 600 described above. For a typical lease agreement, the pro rata basis table in the pro rata basis interface 1200 includes only a single row. However, if there are multiple pro rata bases associated with a lease agreement, the pro rata bases will all be of the same type. The pro rata basis table is divided into two sections: a statement section for entering values from the reconciliation statement received from the landlord and an expected section that is calculated from the values entered in the lease agreement component or entered by the user based on information from other sources.

FIG. 12A provides an illustration of a pro rata basis table for a fixed percentage pro rata basis according to an embodiment of the present invention. The pro rata basis, as described in relation to "pro rata basis" interface 500, is the method used to determine what portion (i.e., percentage) of the landlord's expenses are passed on to the tenant and provides how the portion of the expenses to be passed on the tenant is to be determined. In the embodiment of the present invention illustrated in FIG. 12A, "pro rata basis" table 1210 includes "name" column 1201, "statement tenant area" column 1202, "statement total area" column 1203, "statement pro rata percentage" column 1204, "expected tenant area" column 1205, "expected total area" column 1206, and "expected pro rata percentage" column 1207.

A fixed percentage entered via the pro rata basis interface 600 of the lease agreement component is defaulted into both the "statement pro rata percentage" column 1204 and the "expected pro rata percentage" column 1207. The tenant may override the default value in the "statement pro rata percentage" column 1204 if the pro rata percentage provided on the reconciliation statement differs from the expected value. The values in the "statement tenant area" column 1202, "statement total area" column 1203, "expected tenant area" column 1205 and "expected total area" column 1206 are displayed for informational purposes only, but the tenant may optionally update these values if desired. The values of "expected tenant area" column 1205 and "expected total area" column 1206 may be defaulted from values entered in pro rata basis interface 500 of the lease agreement component. The tenant area columns represent a total area of the leased property occupied by the tenant during the reconciliation period and expected total area columns represent the total leasable area of the commercial property including the area occupied by the tenant. However, the tenant area and the total area fields are not used in the calculation of the tenant's pro rata basis. Under the fixed percentage method, the pro rata basis is determined based upon a fixed percentage that is not determined from the percentage of the total leasable area that the tenant occupies (at least not directly).

FIG. 12B provides an exemplary illustration of a "pro rata basis" table 1220 for a gross leasable area pro rata basis type according to an embodiment of the present invention. In the embodiment illustrated in FIG. 12B, "pro rata basis" table 1220 includes "name" column 1221, "statement tenant area" column 1222, "statement total area" column 1223, "statement pro rata percentage" column 1224, "expected tenant area" column 1225, "expected total area" column 1226, and "expected pro rata percentage" column 1227. Values entered on in the pro rata basis interface 500 of the lease agreement component are defaulted into "statement tenant area" column 1222, "statement total area" column 1223, "expected tenant area" column 1225 and "expected total area" column 1226. The tenant may optionally edit the value in "statement tenant area" column 1222 and "statement total area" column 1223 if the values provided on the reconciliation statement differ from the default values.

"Statement pro rata percentage" column 1224 is calculated by dividing the value from "statement tenant area" column 1222 (area occupied by the tenant) by the value from "statement total area" column 1223 (gross leasable area). "Expected pro rata percentage" column 1227 is calculated by dividing the value from "expected tenant area" column 1225 (area occupied by the tenant) by the value from "expected total area column" 1226 (gross leasable area).

"Statement pro rate percentage" column 1224 represents the percentage of the landlord's operating expenses for which the landlord has determined that the client is responsible. "Expected pro rata percentage" column 1227 represents the percentage of the landlord's operating expenses for which the tenant expects to be responsible based upon the lease agreement information captured the lease agreement component.

FIG. 12C provides an illustration of a "pro rata basis" table 1230 for a pro rata sales pro rata basis according to an embodiment of the present invention. The percentage of the landlord's expenses to be attributed the client are determined by dividing the tenant's sales by the total sales for the all of the tenants of the property. The sales values are all determined at the time of reconciliation since the sales data is not available at the time that the lease agreement is entered into the property management system, and the sales data will always change from reconciliation period to reconciliation period. Therefore, none of the fields in "pro rata basis" table 1230 have values defaulted from the lease agreement.

"Pro rata basis" table 1230 comprises "name" field 1231, "statement tenant sales" field 1232, "statement total sales" field 1233, "statement pro rata percentage" field 1234, "expected tenant sales" field 1235, "expected total sales" field 1236, and "expected pro rata percentage" field 1237. "Statement tenant sales" field 1232 provides an input for a total sales amount for only the tenant for the reconciliation period obtained from the reconciliation statement, and the "statement total sales" field 1233 provides an input for total sales amount for all tenants at the property for the reconciliation period obtained from the reconciliation statement. The value of "statement pro rata percentage" field 1234 is determined by dividing the value from "statement tenant sales" field 1232 by the value from "statement total sales" field 1233. "Expected tenant sales" field 1235 provides an input for the tenant to enter the tenant's estimation of the tenant's totals sales for the reconciliation period. "Expected total sales" field 1236 provides an input for the tenant to enter a value for totals sales for all tenants of the particular property for the reconciliation period, if the tenant had knowledge of a number different from that provided by the landlord and which the tenant believed to be correct. In most cases, the tenant would leave this field blank. The value of "expected pro rata percentage" field 1237 is determined by dividing the value from "expected tenant sales" field 1235 by the value from "expected total sales" field 1236. For example, a tenant occupying a retail location within a shopping mall has sales of $1 million dollars for the reconciliation period and the total sales for all tenant within in mall is $10 million dollars. The tenant's pro rata share of would be ⅒th or 10 percent of the landlord's operating expenses for the reconciliation period.

FIG. 12D provides an illustration of a "pro rata basis" table 1240 for an occupied area pro rata basis according to an embodiment of the present invention. The occupied area pro rata basis is determined by comparing the area occupied by the tenant to the total occupied area for the property. For example, the tenant may occupy 10,000 square feet of a mall property comprising 100,000 square feet. Therefore, the tenant's pro rata share based upon gross leasable area (as described in FIG. 12B) would be 10%. However, if only 80,000 square feet of the mall is occupied, then under the occupied area pro rata basis, the tenant's pro rata basis would be determined by dividing the tenant's occupied area by the total occupied area for a pro rata basis of 12.5%.

"Pro rata basis" table 1240, like the other pro rata basis table illustrated in FIG. 12A-C, includes statement columns and expected columns. The statement columns comprises fields for displaying values from the reconciliation statement and the expected column comprises fields for displaying expected pro rata basis values, derived automatically from the lease provisions or entered by the user. "Pro rata basis" table 1240 includes "name" field 1241, "statement tenant area" field 1242, "statement total area" field 1243, "statement occupied area" field 1244, "statement occupied percentage" field 1245, "statement pro rata percentage" field 1246, "expected tenant area" field 1247, "expected total area" field 1248, "expected occupied area" field 1249, "expected occupied percentage" field 1250, "expected pro rata percentage" field 1251. Tenant area and total area may be contained in the lease agreement, and the expected values of for these fields may therefore default from values entered into the system for the lease agreement. However, the default values may be changed in the "pro rata basis" table 1240.

"Name" field 1241 displays a name for each pro rata basis entry. "Name" field 1241 displays the name of the pro rata basis entry entered via pro rata basis details interface 700 (described above). "Statement tenant area" field 1242 provides an input for the area occupied by the tenant as indicated on the reconciliation statement. The area may be measured in various units of measure such as square feet or square meters. "Statement total area" field 1243 provides an input for the gross leasable area of the entire property as indicated on the reconciliation statement.

"Statement occupied area" field 1244 provides an input for the area of the entire property that was actually occupied by tenants during the reconciliation period as indicated on the reconciliation statement. The occupied area may be less than the statement total leasable area of the property if the property was not fully occupied throughout the reconciliation period.

"Statement occupancy %" field 1245 indicates a percentage of the property that was occupied. "Statement occupancy %" field 1245 provides an input for entering an occupied percentage of the property based upon the values in "statement occupied area" field 1244 and the value stored in the "statement total area" field 1243. According to one embodiment of the invention, the value of "Statement occupancy %"

can be automatically calculated from "Statement Total Area" and "Statement Occupied Area".

"Statement pro rata percentage" field 1246 provides an input for the pro rata percentage indicated on the reconciliation statement. The value in "statement pro rata percentage" field 1246 represents a percentage determined by dividing the area occupied by the tenant by the total occupied area for the property. The property management system may determine a default value for this field based upon the tenant occupied area and total occupied area entered from the reconciliation statement. However, the default value may be overridden.

Expected tenant area fields may default from the values entered via pro rata basis details interface 600. Expected tenant area field 1247 displays the expected area occupied by the tenant entered via pro rata basis details interface 700. The expected tenant area is derived from lease provisions. The expected area typically may change through amendments to the lease agreement. However, the default expected occupied area value may also be overridden by entering a new value.

"Expected total area" field 1248 provides an input for entering the expected gross leasable area of the property. The expected gross leasable area may default from values entered via pro rata basis details interface 600, but the default values may be overridden by entering a new value.

"Expected occupied area" field 1249 provides an input for entering the area of the property occupied by all tenants that the user believes to be correct, if different from what is shown on the landlord statement. The tenant may have information that differs from that on the landlord statement if, for example, the tenant has performed a field audit of the landlord's records or has independent knowledge of the dates of tenancies of other tenants in the property.

"Expected occupancy %" field 1250 provides an input for entering the occupied percentage of the property. The occupied percentage value is determined by dividing the occupied area value from "expected occupied area" field 1249 by the gross leasable area value from "expected total area" field 1248. The value of "Expected occupancy % may be calculated automatically.

"Expected pro rata percentage" field 1251 represents a percentage determined by dividing the area occupied by the tenant by the total occupied area for the property. The value of "pro rata percentage" field 1251 may be automatically determined by dividing the value in "expected tenant area" field 1247 by the value in "expected occupied" field 1249. The default value may be also overridden by entering a new value in this field.

FIG. 12E provides an exemplary illustration of a "pro rata basis" table 1260 for an occupied area with floor pro rata basis according to an embodiment of the present invention. "Name" column 1261 displays the name of the pro rata basis amount entered via pro rata basis interface 600 described above. The fields in "pro rata basis" table 1260 are divided into two groups: statement fields and expected fields. The statement fields provide inputs for capturing data from the reconciliation statement while the expected fields provide inputs for capturing values expected by the tenant. Some of the expected values may default from the pro rata basis data extracted from the lease agreement and entered in pro rata basis interface 500. The expected tenant area fields may default from the values entered via pro rata basis details interface 700. Expected tenant area field 1268 display the expected area occupied by the tenant entered via pro rata basis details interface 700. The expected tenant area is derived from lease provisions. The expected area typically may change through amendments to the lease agreement. However, the default expected occupied area value may also be overridden by entering a new value.

"Name" field 1261 displays a name for each pro rata basis entry. "Name" field 1261 display the name of the pro rata basis entry entered via pro rata basis details interface 600 (described above). "Statement tenant area" field 1262 provides an input for the area occupied by the tenant as indicated on the reconciliation statement. The area may be measured in various units of measure such as square feet or square meters.

"Statement total area" field 1263 provides an input for the gross leasable area of the entire property as indicated on the reconciliation statement. "Expected total area" field 1269 provides an input for entering the expected gross leasable area of the property. The expected gross leasable area may default from values entered via "pro rata basis details" interface 700, but the default values may be overridden by entering a new value. "Expected total area" field 1269 provides an input for entering the expected gross leasable area of the property. The expected gross leasable area may default from values entered via "pro rata basis details" interface 700, but the default values may be overridden by entering a new value.

"Statement occupied area" field 1264 provides an input for the area of the entire property that was actually occupied by tenants during the reconciliation period as indicated on the reconciliation statement. The occupied area may be less than the statement total leasable area of the property if the property was not fully occupied throughout the reconciliation period. "Expected occupied area" field 1270 provides an input for entering the area of the property occupied by all tenants that the user believes to be correct, if different from what is shown on the landlord statement.

"Statement occupied percentage" field 1265 indicates a percentage of the property that was occupied. "Statement occupied percentage" field 1265 provides an input for entering an occupied percentage of the property based upon the values in "statement occupied area" field 1264 and the value stored in the "statement total area" field 1263. The value can be calculated automatically. "Expected occupied percentage" field 1271 provides an input for entering the occupied percentage of the property. The occupied percentage value is determined by dividing the occupied area value from "expected occupied area" field 1270 by the gross leasable area value from "expected total area" field 1269.

"Statement floor percentage" field 1266 will default from the value in the Pro Rata Basis details interface 700. If the value on the landlord statement is different from the default value, the user may override the default with the value from the statement. "Expected floor percentage" field 1272 will populate from the value in the Pro Rata Basis details interface 700. The value of the expected floor value percentage is determined by the lease agreement, and is therefore not editable. If the expected floor value percentage must be changed, the floor percentage may be updated in the lease agreement data via pro rata basis interface 600.

"Statement pro rata percentage" field 1267 provides an input for the pro rata percentage indicated on the reconciliation statement. The value in statement "pro rata percentage" field 1246 represents a percentage determined by dividing the area occupied by the tenant by either the actual total occupied area for the property, or total occupied area of the property if the occupancy percentage were equal to the Floor %, whichever is greater. The property management system may determine a default value for this field based upon the statement tenant occupied area, statement total occupied area, and statement Floor %. However, the default value may be overridden.

"Expected pro rata percentage" field 1273 represents a percentage of the landlord's operating expenses that are to be attributed to the tenant. The value of "expected pro rata percentage" field 1273 is determined by dividing the area occupied by the tenant by either the actual total occupied area for the property, or total occupied area of the property if the occupancy percentage were equal to the expected floor %, whichever is greater. The property management system may determine a default value for this field based upon the expected tenant occupied area, expected total occupied area, and expected Floor % values. However, the default value may be overridden.

Once the information from the reconciliation statement has been entered through pro rata basis interface 1200, the reconciliation process continues with processing of expense groups in "expense groups" interface 1300.

FIG. 13 is an illustration of an "expense groups" interface 1300 according to an embodiment of the present invention. "Expense groups" interface 1300 provides inputs for capturing expense group amounts from the reconciliation statement and for viewing the expense group related information entered via expense group details interface 700 illustrated in FIG. 7.

"Expense groups" table 1301 enables the user to enter expense group amounts from the reconciliation statement and to view the expense group information entered via the expense group details interface 700.

"Hidden details" column 1302 provides a hyperlink that when activated display additional details such as the pro rata basis name and description associated with the expense. A pro rata basis is associated with an expense group using pro rata basis name dropdown 704 on expense group details interface 700.

"Expense group name" field 1303 is a read-only field that displays the expense group name associated with an expense group. The expense group names are assigned to the expense groups via expense group name field 702 of expense group details interface 700.

"Statement amount" field 1304 provides an input for entering the expense amount appearing on the reconciliation statement. The value of "statement amount" field 1304 reflects a total amount of expenses attributed to the tenant prior to a multiplier (column 1306) being applied that may increase or decrease the amount actually recoverable from the tenant.

"Statement percent change" field 1305 is a read-only field the value of which is calculated based upon the statement amount for the expense group from the previous reconciliation period. For expenses subject to a cap, the percentage change may be used to provide an upper limit on how much the expense may increase from expense period to expense period.

"Statement multiple" field 1306 provides an input for a multiplier that is used to indicate an adjustment to pro rata share of the operating expenses from statement amount field 1304 for which the tenant is responsible. The multiple is a value greater than or equal to zero.

"Statement recoverable amount" field 1307 provides an input for the amount of the operating expenses to be recovered from tenants. A default value for the recoverable amount may be determined by multiplying the value from "statement amount" field 1304 by the value of "multiple" field 1306. However, the default value may be overridden by entering a different value into "statement recoverable amount" field 1307.

"Expected multiple" field 1308 is a field for displaying the expected multiple used to determine the recoverable amount of the operating expenses from which the tenant's pro rata share will be calculated. The multiple is typically determined as a part of the lease agreement, and "expected multiple" field 1308 is populated with the value entered in multiple field 608 of expense group detail interface 600. The multiple is a number greater than or equal to zero. According to an embodiment of the present invention, the tenant may override the default expected multiple value by entering a new value in "expected multiple" field 1308.

"Expected recoverable amount" field 1309 provides an input for the expected recoverable amount for the expense group, i.e. the actual amount of the expenses that the tenant expects to pay. The expected recoverable amount may default based upon the expected "Subject to cap" checkbox 1310 is a read-only field that indicates whether the expense group is subject to a cap. Expenses subject to cap are limited to a maximum amount by the cap. Caps associated with the lease agreement are defined in caps interface 800, described above. If cap checkbox 706 was checked when setting up an expense group in the expense group detail interface 700, the expense group is subject to a cap.

"Subject to fee" checkbox 1312 is a read-only checkbox that indicates whether the expense group is subject to an administration fee. If "fee" checkbox 707 was checked when setting up an expense group in the expense group detail interface, the expense group is subject to an administrative fee.

"Contributions" table 1321 displays a read-only view of contribution types entered via the expense group details interface 700. Contributions are amounts paid by a tenant, or class of tenants, that are subtracted off the top from the total expenses to be allocated to each of the other tenants. For example, an anchor tenant may make a contribution toward operating expenses and the anchor tenant's contribution is subtracted from the amount due before the pro rata share of each of the tenants is determined. FIG. 2, row 230 provides an example of an anchor contribution on a reconciliation statement. Although not the same as expense groups, contributions may be entered into the property management system via expense group details interface 700 by checking checkbox 705.

Once the information from the reconciliation statement has been entered through "expense groups" interface 1300, the reconciliation process continues with "other entries" interface 1400.

FIG. 14 is an illustration of an "other entries" interface 1400 of "other entries" component 124 according to an embodiment of the present invention. The layout and content of the other entries interface 1400 is dynamically determined based upon the contents of the lease agreement. For example, the lease agreement in the embodiment of the present invention illustrated in FIG. 14 includes a cap and administration fees, but does not include a carry-forward amount, or stops, which may be included in other lease agreements. Thus, FIG. 14 is merely illustrative of one embodiment of other entries interface 1400.

"Other entries" interface 1400 includes "other entries" table 1401, which provides a side-by-side comparison of statement and expected values for a reconciliation period. Column 1402 provides a read-only name field that identifies each of the entries in the table. Column 1403 provides a statement override input field for entering a value from the reconciliation statement that overrides the value from the expected values in column 1404. The expected values of column 1404 are derived from the lease agreement information entered while setting up the lease agreement and/or other information entered during the reconciliation process. Column 1405 provides inputs for overriding the default expected values, if necessary. The override values in columns 1403 and 1405 will be used in determining the values to be displayed in the side-by-side comparison of statement and expected values included in the review reconciliation interface (described below).

According to the embodiment illustrated in FIG. 14, entries include the number of days which the tenant occupied the premises (row 1410), a minimum expenses amount (row 1411) indicating a minimum amount of expenses which the tenant may have to pay for the reconciliation period, and a cap amount (row 1412) indicating a maximum amount of expenses that the tenant have to pay for the reconciliation period. Table 1401 also includes an administrative fee percent (row 1414) indicating the percentage of administrative fees that will be applied to those expenses which are subject to administration fees. Table 1401 also includes total days value (row 1414), which indicates the total number of days in the reconciliation period, a paid in period total (row 1415), which indicates that total amount of expenses paid by the tenant during the reconciliation period, and a prior reconciliation payments total (row 1416), which indicates total amount of reconciliation payments made during the reconciliation period.

According to the present embodiment, the reconciliation statement received from the landlord failed to prorate the tenant's charges based upon the tenant's January 15 move-in date (row 1410). The tenant expected the occupied days to be 352 (column 1404). The tenant enters the statement override amount of 366 days from the reconciliation statement in column 1403 of row 1410. The landlord also used an administration fee percentage that was higher than the expected administration fee percentage (row 1413). The administration fee percentage of 8% included on the reconciliation statement is entered into column 1403 for row 1413. The landlord also failed to credit the tenant for the full amount of the estimated payments that the tenant made during the reconciliation period (row 1415). The tenant enters the paid in period total from the statement in the override field of column 1403.

According to an embodiment of the present invention, the constraint values (cap and minimum) and the paid in period amount in the expected column are based upon prior reconciliations and estimated payments made during the reconciliation period. For new tenants new to the property management system, some of the information used to calculate these values may not be available, and the correct values will need to be entered in expected override column 1405.

Once the information from the reconciliation statement has been entered through interfaces 1200, 1300, and 1400, the software performs all calculations necessary to present a recreation of the reconciliation statement. The results, showing the landlord version and the tenant's expected version in side-by-side format, are presented in the "Review Reconciliation" interface 1500 (review reconciliation interface 1600 of FIG. 16 provides another illustration of an embodiment of the "review reconciliation" interface.

FIGS. 15 and 16 provide illustrations of two embodiments of a review reconciliation interface (review reconciliation interface 1500 and review reconciliation interface 1600) of "review reconciliation" component 125 according to embodiments of the present invention. The review reconciliation interface presents the information entered in the various reconciliation screens and presents the data in a spreadsheet-like format that provides a side-by-side comparison between the landlord's version ('statement') of the reconciliation calculation and the tenant's version ('expected'). The review reconciliation interface includes difference columns that highlight the any discrepancies between the expected amounts and statement amounts. The review reconciliation also includes an amount due at the bottom of the screen that indicates how much the tenant still owes the landlord for expenses incurred during the reconciliation period.

FIGS. 15 and 16 illustrate how differences in the data, such as the expense-related lease provisions, may have a significant impact on the layout and the calculations of the review reconciliation interface. FIGS. 15 and 16 merely provide illustrations of two possible configurations of the review reconciliation interface. One skilled in the art will recognize that other configurations are possible based upon the information included in the lease agreement and the information received on the reconciliation statement.

The review reconciliation interface may be used by the tenant to perform both a basic reconciliation as well as a desktop audit. The review reconciliation interface enables the tenant to perform a basic reconciliation and a detailed desktop audit of the information provided on the reconciliation statement. As described above, a basic reconciliation is a comparison of the amount paid by the tenant over the course of the reconciliation period with the amount owed as indicated on the reconciliation statement. The desktop audit, in contrast, is a much more in depth audit that is performed to verify the contents of the reconciliation statement. The desktop audit involves reviewing information from the tenant's records, and may include gather additional information from the landlord and/or others in an attempt to verify the accuracy of information included on the reconciliation statement.

Desktop audits often require complex calculations that are very much driven by the operating expenses-related provisions of the lease agreement. The conventional approach for performing a desktop audit typically includes the creation of one or more spreadsheets to perform these calculations. Often, the tenant will need to create one or more spreadsheets for each lease agreement. Template spreadsheets generally cannot be used due to the complex nature of the calculations and the vast number of permutations in the methods that may be used to determine the tenant's pro rata share of the operating expenses.

The review reconciliation interface overcomes the problems by dynamically configuring the calculations and the layout of the review reconciliation interface based upon the operating expense data entered via the interface of the lease agreement component, illustrated in FIGS. 5-10, and information entered from the reconciliation statement via the reconciliation interface, illustrated in FIGS. 11-14.

Ideally, the dynamically generated layout of review reconciliation interface will be similar to the layout of the reconciliation statement provided by the landlord. However, since there are many different ways of calculating and presenting the information included in the review reconciliation interface, the layout of the review reconciliation interface may differ somewhat from the layout of the reconciliation statement.

Review reconciliation interface 1500 includes a header 1501 that is similar to the header found on the other reconciliation interfaces, such as header 1301 described above. Header 1201 provides information describing the current reconciliation being processed and provides navigation controls that enable the user to return to previous steps in the reconciliation process. Any changes made to previous steps in the reconciliation will result in the reconciliation data being recalculated and the data displayed in the review reconciliation will be updated accordingly. The header also includes a print option that enables a copy of the review reconciliation and/or the various reconciliation interfaces to be printed. Printed copies of the reconciliation data may be useful for archival purposes or for providing information to the landlord in the event of a dispute regarding charges on the reconciliation statement.

Review reconciliation interface 1500 is dynamically generated for each reconciliation based upon the provisions of the lease agreement captured in the lease agreement component described above. Information most relevant to reconciliation of the expenses associated with a lease agreement are presented in a concise and easy to read manner that is specific to that lease agreement, which facilitates quick identification of discrepancies between what the tenant was billed on the reconciliation statement and what the tenant expected to be billed based upon the expected expense calculations.

Below the header region 1501, the review reconciliation interface is comprised of two general parts, the upper region 1521 and the lower, or summary, region 1531. In the upper region, the calculations begin with the subtotal(s) of landlord expenses and end with the tenant share, after applying contributions, fees, and/or constraints, as appropriate. The upper region 1521 may comprise multiple independent calculations, or sub-regions, in cases where there is more than one pro rata basis defined in the agreement and/or some but not all expense groups are subject to constraints. The layout of the upper region is highly variable and depends on a number of elements in the operating expenses provisions of the lease and entered through the operating expenses agreement interface components method details 500, pro rata basis details 600, expense groups 700 and caps 800. The system dynamically configures this interface 1521 based on these provisions.

The lower region continues the calculations starting with the pro rata share amount(s) that are the result of the calculations in the upper region. Additional adjustments to the tenant's share are performed in this region to arrive at the tenant's actual obligation for this reconciliation period, called Occupancy Prorated Total Charge 1541, and amounts already paid against this obligation are further deducted to arrive at the Reconciled Amount 1544 which, in most cases, is the amount due the landlord.

Table 1521 displays expense totals for the landlord including the tenant's pro rata share of those expenses. Table 1521 comprises a label column 1522, which identifies the values in each row of table 1521. Table 1521 also includes a statement amount column 1523, a difference column 1524, and an expected amount column 1525. Statement amount column 1523 comprises values derived from the landlord reconciliation statement. If some expense groups are subject to cap and others are not, there will be a second set of Statement, Difference and Expected columns. In the embodiment illustrated in FIG. 15, some of the expense are subject to cap, therefore table 1521 also includes a statement amount column 1526, a difference column 1527, and an expected amount column 1528. Calculations on expenses subject to cap are independent from those on expenses not subject to cap, at this stage of the calculation.

Table 1531 provides a summary of the pro rata share values from the upper region and further adjustments to the amount owed by the tenant. Table 1531 comprises a label column 1532, which identifies the values in each row of table 1531. Table 1531 also includes a statement amount column 1533, a difference column 1534, and an expected amount column 1535. Statement amount column 1533 comprises values derived from the landlord reconciliation statement. Expected column comprises values the tenant has reason to believe are correct, and may or may not be the same as values in the statement column. Difference column 1534 comprises the difference between the amount in statement column 1533 and the value in expected column 1535.

Tables 1521 and 1531 are dynamically generated based upon lease agreement provisions captured in the lease agreement component, and the configuration of tables 1521 and 1531 may vary depending upon the provisions of the lease agreement associated with the current reconciliation. Thus, the layout of tables 1521 and 1531 are merely illustrative of one embodiment of the present invention, in relation to one particular lease agreement. One skilled in the art will recognize that that additional or fewer rows and/or columns may be included in tables 1521 and/or 1531 depending upon the provisions of a lease agreement associated with a reconciliation being edited.

The reconciliation illustrated in FIG. 15 relates to an operating expense agreement in which some expense groups are subject to a cap: the review reconciliation interface 1500 interface includes cap analysis rows 1551 and 1552 which are applicable only to those expense amounts that are subject to cap. If no expenses were subject to a cap, these rows would not display. Furthermore, the cap is applied to landlord totals in the present example. If the cap was applied after calculation of tenant's pro rata share of the operating expenses, as is true for some agreements, then a cap line item would be included in table 1531. These are merely illustrative examples of how the layout varies with the provisions of the lease.

The lease agreement associated with the reconciliation illustrated in FIG. 15 includes only one pro rata basis (row 1553 of table 1521). As described above, a lease agreement may include multiple pro rata shares for determining the tenant's share of operating expenses. For lease agreements including multiple pro rata shares, the set of rows in table 1521 would repeat once for each pro rata basis associated with the lease agreement. Separate calculations of the tenant's pro rata share of different types of expenses would be done in each of these sub-regions of region 1521 and the results would be added together in the lower, summary, region 1531.

The lease agreement associated with the reconciliation illustrated in FIG. 15 also has no administration fees, contributions, minimums, overruns, or stops. Otherwise rows for incorporating values into the calculation would be included in review reconciliation interface 1500. If administration fees were associated with the lease agreement, the layout of review reconciliation interface 1500 would be configured to reflect whether the administration fees were applied to the total amount owed by the tenant either before or after the cap was applied. According to some provisions of some leases, expenses caps are calculated based on the sum of expenses plus administration fees, while according to others, administration fees are not subject to caps and are added after expense amounts are capped.

Table 1531 provides a breakdown of various tenant specific data, such as the total number of days that the tenant occupied the property during the reconciliation period and an occupancy proration factor, which is determined by dividing the number of days that the tenant occupied the property for the reconciliation period by the total number of days in the reconciliation period.

The amount(s) indicating the tenant's pro rata share (row 1554 in this example) of the landlord's expenses (table 1521) is carried over to table 1531 (row 1547 in this example) where additional operations are performed. The value in statement column 1533 for row 1547 is the equal to the sum of the tenant's share of capped (from statement column 1523 row 1554) and non-capped expenses (column 1526 row 1554). The tenant's expected share (row 1554) of the landlord's expenses (table 1521) is carried over to row 1547 of table 1531. The value in expected column 1535 for row 1547 is equal to the sum of the tenant's expected share of capped expenses (column 1525, row 1554) and expected share of non-capped expenses (column 1528, row 1554). The data in row 1547 represents the single pro rata basis associated with the embodiment illustrated in FIG. 15, which is named "Full Parcel." If the lease agreement associated with the reconciliation information illustrated in FIG. 15 had more than one pro rata basis associated with it, then a line item similar to row 1547 would have been included in table 1531 for each of the pro rata bases. "Tenant total charge" (row 1599) is the sum of the pro rata bases. Since there is only a single pro rata basis associated in this case (row 1547), the values in row 1599 are equal to those in row 1547.

Rows 1548 and 1549 of table 1531 provide information from the prior reconciliation period. The values in row 1548 represent the tenant's total charges from the prior reconciliation period. The values in row 1549 represent a percent change from the tenant's total charges in the previous reconciliation period to the tenant's charges in the current reconciliation period. The values displayed in row 1548 and 1549 enable the tenant to quickly compare the tenant's charges from the current reconciliation period to those of the prior reconciliations period. The values in rows 1548 and 1549 are purely included for informational purposes and are not included in the calculation of the total amount owed by the client. Rows 1548 and 1549 are blank in the embodiment illustrated in FIG. 15, because the tenant did not have any data in the system for the previous reconciliation period.

Row 1536 includes an adjustment field in both statement column 1533 and expected column 1535. The tenant may enter an adjustment amount into one of these fields, neither of these fields, or both of these fields. An adjustment may, for example, be entered in either statement column 1533 or expected column 1535 for various reasons. For example, a mathematical error in the reconciliation statement provided by the landlord may have caused the values in statement column 1533 to not match the values in the landlord statement itself, or the lease may have included an expense provision calculated in a way that could not be correctly modeled in the lease provisions set up in the lease agreement component. Any adjustment amounts entered in row 1536 will be added to the tenant's total charge and to arrive at an adjusted total charge values in row 1537. If no values are entered in the adjustment fields of row 1536, the adjusted total charge values of row 1537 will be equal to the tenant's total charge values from row 1599.

The values in row 1538 reflect a total number of days that the tenant occupied the leased property during the reconciliation period, and the values in row 1539 reflect the total number of days comprising the reconciliation period. The values in row 1540 are an occupancy proration factor determined by dividing the total number of days that the tenant occupied the leased property during the current reconciliation period (row 1538) by the total number of days comprising the reconciliation period.

Row 1541 comprises prorated total charge values which are determined by multiplying the adjusted total charge values of row 1537 with the occupancy proration factor values of row 1540. The prorated total charge values reflect the portion of the adjusted total charge values for which the tenant actually occupied the leased space.

Row 1542 comprises totals of any estimated payments that have been made by the tenant for the current reconciliation period. The estimated payment totals of row 1542 are deducted from the prorated total charge values of row 1541.

Using the information found in rows 1541 and 1542, the tenant may perform a basic reconciliation. A basic reconciliation, is a comparison between the amount paid by the tenant during the course of the reconciliation period (row 1542) and the tenant's prorated share of the operating expenses for the reconciliation period (row 1541). A tenant may perform a basic reconciliation at the time that the that reconciliation statement is received from the landlord, and may later return to the reconciliation information entered into the reconciliation interfaces illustrated in FIGS. 11-16 to perform a detailed desktop audit.

Row 1543 comprises totals of any reconciliation payments that have been made by the tenant for the current reconciliation period. The reconciliation payment totals of row 1543 are also deducted from the prorated total charge values of row 1541.

Row 1544 reflects reconciled amount owed by the tenant after subtracting estimated payments (row 1542) and reconciliation payments (row 1543) from the prorated total charge values for the reconciliation period (row 1541).

Row 1545 includes another adjustment field in both statement column 1533 and expected column 1535. The tenant may enter an adjustment amount into one of these fields, neither of these fields, or both of these fields. Values entered into the adjustment fields of row 1545 are added to the reconciled amount owed from row 1544 to arrive at an amount due in row 1546. The tenant may, for example, decide to adjust the amount due in response to a small difference between the amount due in statement column 1533 and the amount due in expected 1535, where the difference between the statement amount due and the expected amount due is trivial enough that it would not be worthwhile for the client to spend time investigating and/or disputing the difference. If the tenant enters an adjustment, the tenant may also enter an adjustment note in an adjustment note field (not shown).

The amount due 1546 represents the outstanding amount due from the tenant's share of the operating expenses for the reconciliation period.

There were no discrepancies between the statement and expected amounts in the example illustrated in FIG. 15. Had any differences between the statement and expected values occurred, a non-zero different amount would have appeared in at least one of columns 1524, 1527 and 1534.

Review reconciliation interface 1500 may be used to create reconciliation payments to pay an outstanding amount due. A reconciliation payment may be created by selecting "create reconciliation payment" in the dropdown 1570. Payment term amount field 1571 defaults to the expected amount due value (row 1546, column 1535) amount due (row 1546). Alternatively, if the reconciliation process had not yet been started (no values entered from the reconciliation statement), the value in payment term amount field 1571 may default from statement amount due field 1573, which reflects the amount entered into the Statement Amount Due field 1122 in the interface 1100, presumably upon initial receipt of the statement.

According to some embodiments of the present invention, the tenant may override the default values determined for payment term amount field 1571 and create a reconciliation payment for a different amount. However, if the tenant decides to override the default values in the payment term amount field 1571, a reconciliation note may be added to the reconciliation indicating why the amount of the reconciliation payment was changed.

Review reconciliation interface 1500 may also be used to create revisions of an existing reconciliation. Each revision of a reconciliation is assigned an unique revision number to that identifies the revision. According to an embodiment of the present invention, the tenant is only able to make revisions to the most recently created revision of the reconciliation or to create a new revision. Prior versions of the reconciliation are read-only, providing a snapshot of the reconciliation at the point of time where the revision was saved. The revisions may be used to provide a historical account of the changes that have been made to a reconciliation. The tenant may create a new revision for each change that is made to the reconciliation (such as an adjustment or payment).

FIG. 16 is an illustration of another review reconciliation interface 1600 of "review reconciliation" component 125 according to an embodiment of the present invention. "Review reconciliation" interface 1600 illustrates an example of a reconciliation where some expense are subject to cap and some of the expense are not subject to cap. The cap illustrated in this example is calculated on the tenant share, and thus, is applied after the tenant's pro rata share of the operating expenses is calculated. FIGS. 15 and 16 illustrate how the layout and calculations of the "review reconciliation" interface are dynamically data driven and based upon the lease agreement data captured in the lease agreement component described above.

As described above, the review reconciliation interface is comprised of two general parts, the upper region 1621 and the lower, or summary, region 1631. In the upper region, the calculations begin with the subtotal(s) of landlord expenses and end with the tenant share, after applying contributions, fees, and/or constraints, as appropriate. The upper region 1621 may comprise multiple independent calculations, or sub-regions, in cases where there is more than one pro rata basis defined in the agreement and/or some but not all expense groups are subject to constraints. The layout of the upper region is highly variable and depends on a number of elements in the operating expenses provisions of the lease and entered through the operating expenses agreement interface components method details 500, expense groups 700 and caps 800. The system dynamically configures this interface 1621 based on these provisions.

The lower region continues the calculations starting with the pro rata share amount(s) that are the result of the calculations in the upper region. Additional adjustments to the tenant's share are performed in this region to arrive at the tenant's actual obligation for this reconciliation period, called Occupancy Prorated Total Charge 1641, and amounts already paid against this obligation (amount paid in current period 1642 and prior reconciliation payments 1643) are further deducted to arrive at the Reconciled Amount 1644 which, in most cases, is the amount due the landlord.

Table 1621, like table 1521 described above, displays expense totals for the landlord including the tenant's pro rata share of those expenses. Table 1621 comprises a label column 1622, which identifies the values in each row of table 1621. Table 1621 also includes a statement amount column 1623, a difference column 1624, and an expected amount column 1625. Statement amount column 1623 comprises values derived from the landlord reconciliation statement. In the embodiment illustrated in FIG. 16, some of the expense are subject to cap, therefore table 1621 also includes a statement amount column 1626, a difference column 1627, and an expected amount column 1628. If some expense groups are subject to cap and others are not, there will be a second set of Statement, Difference and Expected columns. Calculations on expenses subject to cap are independent from those on expenses not subject to cap, at this stage of the calculation.

Table 1631 provides a summary of the pro rata share values from the upper region and further adjustments to the amount owed by the tenant. Table 1631 comprises a label column 1632, which identifies the values in each row of table 1631.

Table 1631 also includes a statement amount column 1633, a difference column 1634, and an expected amount column 1635. Statement amount column 1633 comprises values derived from the landlord reconciliation statement. Expected column comprises values the tenant has reason to believe are correct, and may or may not be the same as values in the statement column. Difference column 1634 comprises the difference between the amount in statement column 1633 and the value in expected column 1635.

Tables 1621 and 1631 are dynamically generated based upon lease agreement provisions captured in the lease agreement component, and the configuration of tables 1621 and 1631 may vary depending upon the provisions of the lease agreement associated with the current reconciliation. Thus, the layout of tables 1621 and 1631 are merely illustrative of one embodiment of the present invention, in relation to one particular lease agreement. One skilled in the art will recognize that that additional or fewer rows and/or columns may be included in tables 1621 and/or 1631 depending upon the provisions of a lease agreement associated with a reconciliation being edited.

The reconciliation illustrated in FIG. 16 relates to an operating expense agreement in which some expense groups are subject to a cap. However, unlike the reconciliation illustrates in FIG. 15, the cap is applied to the tenant share rather than to the landlord's operating expenses as illustrated in FIG. 15. Thus, no cap line items are included in table 1621 and cap line items instead are included in table 1631.

The lease agreement associated with the reconciliation illustrated in FIG. 16 includes only two pro rata bases (rows 1650 and 1660 of table 1621). As described above, a lease agreement may include multiple pro rata shares for determining the tenant's share of operating expenses. For lease agreements including multiple pro rata shares, calculations for each pro rata share are broken out separately in table 1621 with line items associated with each pro rata share grouped together. The totals from the separate pro rata shares are added together in the lower, summary, region 1631.

The lease agreement associated with the reconciliation illustrated in FIG. 16 includes expenses that are subject to fees. Row 1651 provides the total expenses subject to fee for expenses associated with the "Total GLA" pro rata basis (row 1650). The reconciliation also includes contributions row 1652, which in this particular reconciliation, are deducted from the total expenses subject to fee (row 1651) to arrive at the net expenses subject to fee (row 1653). The net expenses subject to fee are the amount of expense that will be subject to an administrative fee. The fee percentage provided in row 1654 is used to determine the amount of administration fees (fee amount, row 1655) that will be applied to the expenses. The fee amount (row 1655) is added to the net expenses subject to fee (row 1653) to arrive at the subtotal of the expenses with fee (row 1656). The subtotals of subject to fee (row 1656) is then multiplied by the tenant's pro rata share percentage (row 1657) to arrive at the tenant's share (row 1658) for the "Total GLA" pro rata basis.

A similar, but slightly different set of calculations are applied to determine the tenant's share of expenses associated with the "In-line Only" pro rata basis (row 1660). Like the expenses associated with the "Total GLA" pro rata basis (row 1650), some expenses associated with the "In-line Only" pro rata basis (row 1660) are subject to administration fees. The total amount subject to fee (row 1661) indicates the total amount of expenses associated with the "In-line Only" pro rata basis (row 1660) that are subject to fee. "In-line Only" pro rata basis (row 1660) is not subject to contributions. Therefore, the total amount subject to fee (row 1661) is multiplied by the fee percentage (row 1662) to determine the fee amount (row 1663). The fee amount (row 1663) is added to the total amount subject to fee (row 1661) to arrive at the subtotal of expenses with fee (row 1664). "In-line Only" pro rata basis (row 1660) also has expenses associated with it that are not subject to fee and are thus broken out into a separate line item, net expenses not subject to fee (row 1665), that is separate from the total expenses subject to fee (row 1661). The total net expenses (row 1666) is determined by adding subtotal of expenses with fee (row 1664) and the expenses not subject to fee (row 1665). The total net expenses (row 1666) are then multiplied by the tenant's pro rata share percentage (row 1667) to arrive at the tenant's share (row 1668) for the "In-line Only" pro rata basis.

The portion of the tenant's share of the operating expenses that are subject to cap and the portion of the expenses that are not subject to cap are calculated separately and displayed in separate columns in table 1621, and these totals are carried down to table 1631. According to some provisions of some leases, expenses caps are calculated based on the sum of expenses plus administration fees, while according to others, administration fees are not subject to caps and are added after expense amounts are capped.

Table 1631 provides a breakdown of various tenant specific data, such as the total number of days that the tenant occupied the property during the reconciliation period and an occupancy proration factor, which is determined by dividing the number of days that the tenant occupied the property for the reconciliation period by the total number of days in the reconciliation period.

The amount(s) indicating the tenant's pro rata share (rows 1658 and 1668 in this example) of the landlord's expenses (table 1621) is carried over to table 1631. The tenant's share of the expenses that are subject to cap (row 1647) is determined by summing the tenant's share of expenses that are subject to cap for each pro rata basis in table 1621. The statement amount (column 1633) of the tenant's share subject to cap (row 1647) is determined by summing the statement value (column 1623) of the tenant's share for each pro rata basis (row 1658 and 1668). The expected amount (column 1635) of the tenant's share subject to cap (row 1647) is determined by summing the expected value (column 1625) of the tenant's share for each pro rata basis (row 1658 and 1668). The cap amount (row 1685) associated with the tenant's share of the operating expenses is used to determine the capped tenant share (row 1686). If the tenant's share subject to cap (row 1647) is less than or equal to the cap amount (row 1685), the capped tenant share is equal to the tenant's share subject to cap (row 1647). Otherwise, if the tenant's share subject to cap (row 1647) is greater than the cap amount (row 1685), the capped tenant share is equal to the cap amount (row 1685).

The statement amount (column 1633) of the tenant's share not subject to cap (row 1687) is determined by summing the statement value (column 1626) of the tenant's share for each pro rata basis (row 1658 and 1668). The expected amount (column 1635) of the tenant's share not subject to cap (row 1687) is determined by summing the expected value (column 1628) of the tenant's share for each pro rata basis (row 1658 and 1668). The tenant's total charge (row 1635) is determined by summing the tenant's share subject to cap (row 1686) with the tenant's share not subject to cap (row 1687).

Rows 1648 and 1649 of table 1621 provide information from the prior reconciliation period. The values in row 1648 represent the tenant's total charges from the prior reconciliation period. The values in row 1649 represent a percent change from the tenant's total charges in the previous reconciliation period to the tenant's charges in the current reconciliation period. The values displayed in row 1648 and 1649 enable the tenant to quickly compare the tenant's charges from the current reconciliation period to those of the prior reconciliations period. The values in rows 1648 and 1649 are purely included for informational purposes and are not included in the calculation of the total amount owed by the client. Rows 1648 and 1649 are blank in the embodiment illustrated in FIG. 16, because the tenant did not have any data in the system for the previous reconciliation period.

Row 1636 includes an adjustment field in both statement column 1633 and expected column 1635. The tenant may enter an adjustment amount into one of these fields, neither of these fields, or both of these fields. An adjustment may, for example, be entered in either statement column 1633 or expected column 1635 for various reasons. For example, a mathematical error in the reconciliation statement provided by the landlord may have caused the values in statement column 1633 to not match the values in the landlord statement itself, or the lease may have included an expense provision calculated in a way that could not be correctly modeled in the lease provisions set up in the lease agreement component. Any adjustment amounts entered in row 1636 will be added to the tenant's total charge and to arrive at an adjusted total charge values in row 1637. If no values are entered in the adjustment fields of row 1636, the adjusted total charge values of row 1637 will be equal to the tenant's total charge values from row 1635.

The values in row 1638 reflect a total number of days that the tenant occupied the leased property during the reconciliation period, and the values in row 1639 reflect the total number of days comprising the reconciliation period. The values in row 1640 are an occupancy proration factor determined by dividing the total number of days that the tenant occupied the leased property during the current reconciliation period (row 1638) by the total number of days comprising the reconciliation period.

Row 1641 comprises prorated total charge values which are determined by multiplying the adjusted total charge values of row 1637 with the occupancy proration factor values of row 1640. The prorated total charge values reflect the portion of the adjusted total charge values for which the tenant actually occupied the leased space.

Row 1642 comprises totals of any estimated payments that have been made by the tenant for the current reconciliation period. The estimated payment totals of row 1642 are deducted from the prorated total charge values of row 1641.

Row 1643 comprises totals of any reconciliation payments that have been made by the tenant for the current reconciliation period. The reconciliation payment totals of row 1643 are also deducted from the prorated total charge values of row 1641.

Row 1644 reflects reconciled amount owed by the tenant after subtracting estimated payments (row 1642) and reconciliation payments (row 1643) from the prorated total charge values for the reconciliation period (row 1641).

Row 1645 includes another adjustment field in both statement column 1633 and expected column 1635. The tenant may enter an adjustment amount into one of these fields, neither of these fields, or both of these fields. Values entered into the adjustment fields of row 1645 are added to the reconciled amount owed from row 1644 to arrive at an amount due in row 1646. The tenant may, for example, decide to adjust the amount due in response to a small difference between the amount due in statement column 1633 and the amount due in expected 1635, where the difference between the statement amount due and the expected amount due is trivial enough that it would not be worthwhile for the client to spend time investigating and/or disputing the difference. If the tenant enters an adjustment, the tenant may also enter an adjustment note in an adjustment note field (not shown).

The amount due 1646 represents the outstanding amount due from the tenant's share of the operating expenses for the reconciliation period.

There were no discrepancies between the statement and expected amounts in the example illustrated in FIG. 16. Had any differences between the statement and expected values occurred, a non-zero different amount would have appeared in at least one of columns 1624, 1627 and 1634.

As described above with respect to FIG. 15, the review reconciliation interface may be used to create reconciliation payments to pay an outstanding amount due. Payment term amount field 1671 defaults to the expected amount due value (row 1646, column 1635) amount due (row 1646). Alternatively, if the reconciliation process had not yet been started (no values entered from the reconciliation statement), the value in payment term amount field 1671 may default from statement amount due field 1673, which reflects the amount entered into the Statement Amount Due field 1122 in the interface 1100, presumably upon initial receipt of the statement.

According to some embodiments of the present invention, the tenant may override the default values determined for payment term amount field 1671 and create a reconciliation payment for a different amount. However, if the tenant decides to override the default values in the payment term amount field 1671, a reconciliation note may be added to the reconciliation indicating why the amount of the reconciliation payment was changed.

Figure 17:
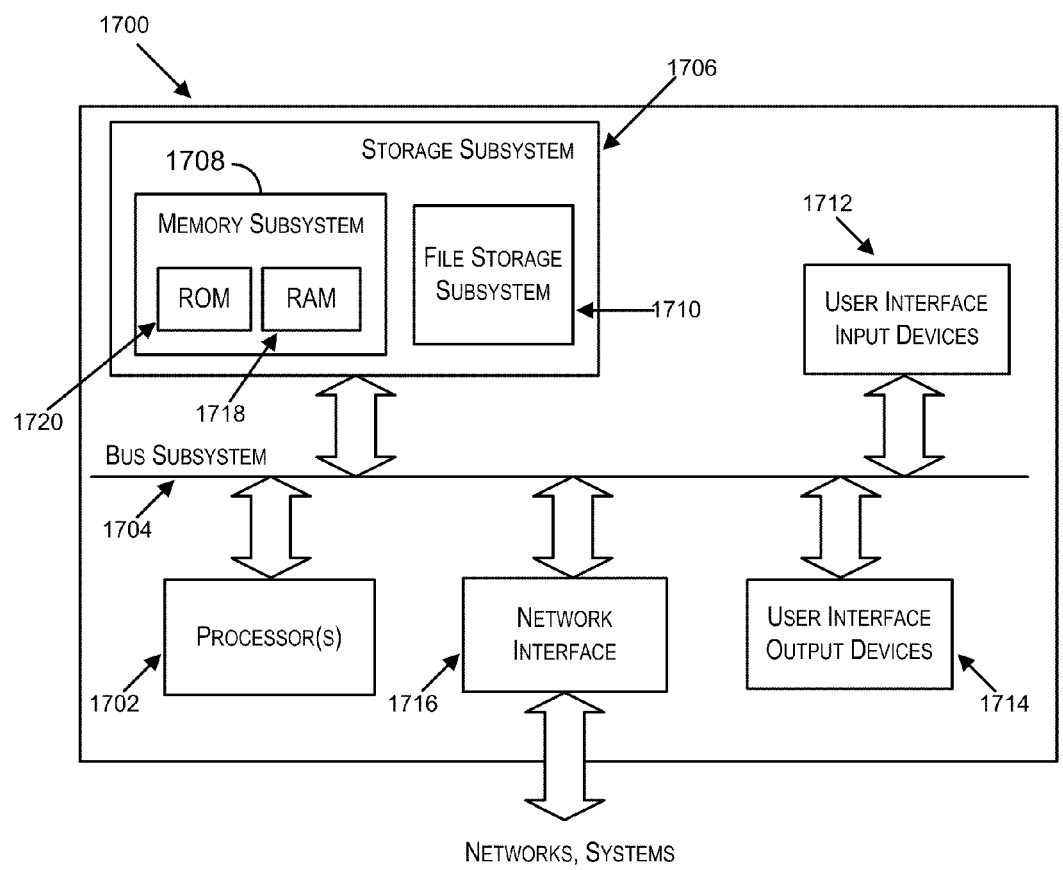
FIG. 17 is a block diagram of a computer system in which the property management system may be implemented according to an embodiment of the present invention.

FIG. 17 is a simplified block diagram of a computer system 1700 that may be used to implement a property management system according to an embodiment of present invention. As shown in FIG. 17, computer system 1700 includes a processor 1702 that communicates with a number of peripheral subsystems via a bus subsystem 1704. These peripheral subsystems may include a storage subsystem 1706, comprising a memory subsystem 1708 and a file storage subsystem 1710, user interface input devices 1712, user interface output devices 1714, and a network interface subsystem 1716.

Bus subsystem 1704 provides a mechanism for letting the various components and subsystems of computer system 1700 communicate with each other as intended. Although bus subsystem 1704 is shown schematically as a single bus, alternative embodiments of the bus subsystem may utilize multiple busses.

Network interface subsystem 1716 provides an interface to other computer systems, networks, and portals. Network interface subsystem 1716 serves as an interface for receiving data from and transmitting data to other systems from computer system 1700.

User interface input devices 1712 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1700.

User interface output devices 1714 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1700.

Storage subsystem 1706 may be configured to store the basic programming and data constructs that provide the functionality of the present invention. Software (code modules or instructions) that provides the functionality of the present invention may be stored in storage subsystem 1706. These software modules or instructions may be executed by processor(s) 1702. Storage subsystem 1706 may also provide a repository for storing data used in accordance with the present invention. Storage subsystem 1706 may comprise memory subsystem 1708 and file/disk storage subsystem 1710.

Memory subsystem 1708 may include a number of memories including a main random access memory (RAM) 1718 for storage of instructions and data during program execution and a read only memory (ROM) 1720 in which fixed instructions are stored. File storage subsystem 1710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 1700 can be of various types including a personal computer, a portable computer, a workstation, a network computer, a mainframe, a kiosk, a server or any other data processing system. Due to the ever-changing nature of computers and networks, the description of computer system 1700 depicted in FIG. 7 is intended only as a specific example for purposes of illustrating the an embodiment of a computer system that may be used to implement the present invention. Many other configurations having more or fewer components than the system depicted in FIG. 17 are possible.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A property management system comprising:
   a processor; and
   a memory communicatively coupled with and readable by the processor and having stored therein a series of instructions which, when executed by the processor, cause the processor to:
   receive information from a lease agreement, wherein the information includes operating expense-related information that defines a tenant's obligation to pay a share of a landlord's operating expenses;

receive information defining rules for determining a plurality of critical dates for a reconciliation process;

receive information from a reconciliation statement provided to the tenant by the landlord, wherein the information from the reconciliation statement comprises a set of operating expenses and information identifying a portion of the operating expenses for which the tenant is responsible as determined by the landlord;

determine the plurality of critical dates for the reconciliation process based on the reconciliation statement and the rules for determining the plurality of critical dates; and reconcile the information identifying the portion of the operating expenses for which the tenant is responsible with actual payments made by the tenant during a reconciliation period, wherein the portion for which the tenant is responsible is determined at least in part from the operating expenses-related information from the reconciliation statement, and wherein reconciling comprises dynamically generating a user interface including a side by side comparison of the operating expense amount for which the tenant is responsible and the actual payments made by the tenant, identifying discrepancies between the values as shown on the landlord's reconciliation statement and those believed to be correct by the tenant along with discrepancies in any antecedent values or calculations, highlighting the discrepancies in the user interface, displaying the user interface, initiating an audit to verify contents of the reconciliation statement, updating the user interface to indicate a status of the audit, displaying the updated user interface, and repeating identifying discrepancies, highlighting discrepancies, updating the user interface and displaying the updated user interface throughout the audit, wherein the audit process is an iterative process comprising a plurality of iterations, wherein repeating identifying discrepancies, highlighting discrepancies, updating the user interface, and displaying the updated user interface throughout the audit is performed on each iteration, and wherein each iteration comprises a revision of the reconciliation information.

2. The property management system of claim 1 wherein initiating the audit comprises:

receiving information about payments made by the tenant during the reconciliation period, wherein the payment information may include estimated payments and reconciliation payments;

deducting from the operating expense amounts attributed to the tenant an amount equal to the estimated payments and the reconciliation payments; and determining a balance due amount owed to the landlord by the tenant by subtracting the estimated payments and the reconciliation payments from the operating expense amounts attributed to the client wherein updating the user interface to indicate the status of the audit comprises displaying the information about the payments made by the tenant and the balance due amount in the side by side comparison.

3. The property management system of claim 1 wherein the format of the side by side comparison is determined at least in part by the operating expense-related information from the lease agreement.

4. The property management system of claim 3 wherein the format of the side by side comparison is similar to the format of the reconciliation statement.

5. The property management system of claim 1 wherein the operating expenses are grouped into one or more expense groups, each expense group corresponding to a type of expense from the expense information extracted from the lease agreement.

6. The property management system of claim 1 wherein the instructions further cause the processor to:

validate calculations used by the landlord to determine the portion of the operating expenses for which the tenant is responsible.

7. The system of claim 1, wherein the determined critical dates are selected from a group consisting of an audit period end date, a date that notification of an estimated payment amount change is due from the landlord, a reconciliation payment due date, and a date that the reconciliation statement is due from the landlord.

8. The system of claim 7, wherein the determined critical dates include the audit period end date and wherein the audit period end date is determined based on the rules for determining the plurality of critical dates and a date of receipt of the reconciliation statement.

9. A method for reconciling operating expenses according to a lease agreement, the method comprising:

receiving at a property management system information from a lease agreement, wherein the information includes operating expense-related information that defines a tenant's obligation to pay a share of a landlord's operating expenses;

receiving at the property management system information defining rules for determining a plurality of critical dates for a reconciliation process;

receiving at the property management system information from a reconciliation statement provided to the tenant by the landlord, wherein the information from the reconciliation statement comprises a set of operating expenses and information identifying a portion of the operating expenses for which the tenant is responsible as determined by the landlord;

determine with the property management system the plurality of critical dates for the reconciliation process based on the reconciliation statement and the rules for determining the plurality of critical dates; and reconciling with the property management system the information identifying the portion of the operating expenses for which the tenant is responsible with actual payments made by the tenant during a reconciliation period, wherein the portion for which the tenant is responsible is determined at least in part from the operating expenses-related information from the reconciliation statement, and wherein reconciling comprises dynamically generating a user interface including a side by side comparison of the operating expense amount for which the tenant is responsible and the actual payments made by the tenant, identifying discrepancies between the values as shown on the landlord's reconciliation statement and those believed to be correct by the tenant, highlighting the discrepancies in the user interface along with discrepancies in any antecedent values or calculations, displaying the user interface, initiating an audit to verify contents of the reconciliation statement, updating the user interface to indicate a status of the audit, displaying the updated user interface, and repeating identifying discrepancies, highlighting discrepancies, updating the user interface and displaying the updated user interface throughout the audit, wherein the audit process is an iterative process and wherein repeating identifying discrepancies, highlighting discrepancies, updating the user interface, and displaying the updated user interface throughout the audit is performed on each iteration.

10. The method of claim 9, wherein initiating the audit comprises:
receiving at the property management system information about payments made by the tenant during the reconciliation period, wherein the payment information may include estimated payments and reconciliation payments;
deducting with the property management system from the operating expense amounts attributed to the tenant an amount equal to the estimated payments and the reconciliation payments; and
determining with the property management system a balance due amount owed to the landlord by the tenant by subtracting the estimated payments and the reconciliation payments from the operating expense amounts attributed to the client wherein updating the user interface to indicate the status of the audit comprises displaying with the property management system the information about the payments made by the tenant and the balance due amount in the side by side comparison.

11. The method of claim 10, further comprising receiving at the property management system information about a reconciliation payment for at least a portion of the balance due amount and wherein updating the user interface to indicate the status of the audit comprises displaying with the property management system the information about the reconciliation payment.

12. The method of claim 9 wherein the format of the side by side comparison is determined at least in part by the operating expense-related information from the lease agreement.

13. The method of claim 12, wherein the format of the side by side comparison is similar to the format of the reconciliation statement.

14. The method of claim 9 wherein the operating expenses are grouped into one or more expense groups, each expense group corresponding to a type of expense from the expense information extracted from the lease agreement.

15. The method of claim 9 wherein validating the information identifying the portion of the operating expenses for which the tenant is responsible further comprises:
validating calculations used by the landlord to determine the portion of the operating expenses for which the tenant is responsible.

16. The method of claim 9, wherein dynamically generating the user interface comprises generating the user interface for each reconciliation based on the information from the lease agreement and the information from the reconciliation statement.

17. A computer-readable storage medium comprising a plurality of instructions which, when executed by a processor, cause the processor to:
receive information from a lease agreement, wherein the information includes operating expense-related information that defines a tenant's obligation to pay a share of a landlord's operating expenses;
receive information defining rules for determining a plurality of critical dates for a reconciliation process;
receive information from a reconciliation statement provided to the tenant by the landlord, wherein the information from the reconciliation statement comprises a set of operating expenses and information identifying a portion of the operating expenses for which the tenant is responsible as determined by the landlord;
determine the plurality of critical dates for the reconciliation process based on the reconciliation statement and the rules for determining the plurality of critical dates; and
reconcile the information identifying the portion of the operating expenses for which the tenant is responsible with actual payments made by the tenant during a reconciliation period, wherein the portion for which the tenant is responsible is determined at least in part from the operating expenses-related information from the reconciliation statement, and wherein reconciling comprises dynamically generating a user interface including a side by side comparison of the operating expense amount for which the tenant is responsible and the actual payments made by the tenant, identifying discrepancies between the values as shown on the landlord's reconciliation statement and those believed to be correct by the tenant along with discrepancies in any antecedent values or calculations, highlighting the discrepancies in the user interface, displaying the user interface, initiating an audit to verify contents of the reconciliation statement, updating the user interface to indicate a status of the audit, displaying the updated user interface, and repeating identifying discrepancies, highlighting discrepancies, updating the user interface and displaying the updated user interface throughout the audit, wherein the audit process is an iterative process and wherein repeating identifying discrepancies, highlighting discrepancies, updating the user interface, and displaying the updated user interface throughout the audit is performed on each iteration.

18. The computer readable medium of claim 17 further comprising:
an instruction that causes the data processor to receive information about payments made by the tenant during the reconciliation period, wherein the payment information may include estimated payments and reconciliation payments;
an instruction that causes the data processor to deduct from the operating expense amounts attributed to the tenant an amount equal to the estimated payments and the reconciliation payments;
an instruction that causes the data processor to determine a balance due amount owed to the landlord by the tenant by subtracting the estimated payments and the reconciliation payments from the operating expense amounts attributed to the client; and
an instruction that causes the data processor to display the information about the payments made by the tenant and the balance due amount in the side by side comparison.

19. The computer readable medium of claim 17 wherein the format of the side by side comparison is determined at least in part by the operating expense-related information from the lease agreement.

20. The computer readable medium of claim 19, wherein the format of the side by side comparison is similar to the format of the reconciliation statement.

21. The computer readable medium of claim 17 wherein the operating expenses are grouped into one or more expense groups, each expense group corresponding to a type of expense from the expense information extracted from the lease agreement.

22. The computer readable medium of claim 17 wherein the instruction that causes the data processor to validate the information identifying the portion of the operating expenses for which the tenant is responsible further comprises:
an instruction that causes the data processor to validate calculations used by the landlord to determine the portion of the operating expenses for which the tenant is responsible.

* * * * *

UNITED STATES PATENT AND TRADEMARK OFFICE
CERTIFICATE OF CORRECTION

PATENT NO. : 8,131,641 B2  Page 1 of 1
APPLICATION NO. : 12/191045
DATED : March 6, 2012
INVENTOR(S) : Hicks et al.

It is certified that error appears in the above-identified patent and that said Letters Patent is hereby corrected as shown below:

Item 56 References Cited, on page 2, in column 2, under "Other Publications", line 4, delete "adminstration" and insert -- administration --, therefor.

In column 4, line 28, delete "an other" and insert -- another --, therefor.

In column 5-6, line 59-67(Col. 5) 1-3(Col. 6), delete "Reconciliation statement—an invoice...................................................................expenses for the reconciliation period." and insert the same on Col. 5, Line 60 as a new Paragraph.

In column 22, line 15, delete "process" and insert -- process. --, therefor.

In column 26, line 52, delete "The" and insert -- the --, therefor. Second occurrence In column 40, line 13, delete "expected" and insert -- expected. --, therefor.

In column 52, line 30, delete "the an" and insert -- an --, therefor.

Signed and Sealed this
Twenty-ninth Day of May, 2012

David J. Kappos
*Director of the United States Patent and Trademark Office*